US012625806B2

(12) United States Patent
Venugopal et al.

(10) Patent No.: US 12,625,806 B2
(45) Date of Patent: May 12, 2026

(54) APPARATUS AND METHODS FOR STATICALLY MAPPING RANDOM WRITE COMMAND DATA

(71) Applicant: Sandisk Technologies, Inc., Milpitas, CA (US)

(72) Inventors: Abhinandan Venugopal, Bengaluru (IN); Amit Sharma, Bengaluru (IN); Sourabh Sankule, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/925,125

(22) Filed: Oct. 24, 2024

(65) Prior Publication Data

US 2026/0119390 A1     Apr. 30, 2026

(51) Int. Cl.
*G06F 12/00*          (2006.01)
*G06F 12/02*          (2006.01)

(52) U.S. Cl.
CPC ............................... *G06F 12/0246* (2013.01)

(58) Field of Classification Search
CPC . G06F 12/0246; G06F 3/0655; G06F 13/1642
USPC ........................................................ 711/103
See application file for complete search history.

(56) References Cited

U.S. PATENT DOCUMENTS

| | | | |
|---|---|---|---|
| 9,213,645 B2 | 12/2015 | Aslam et al. | |
| 11,123,561 B2 | 9/2021 | Li | |
| 11,567,860 B2 | 1/2023 | Kang | |
| 2020/0089629 A1* | 3/2020 | Wang ..................... | G06F 3/061 |
| 2024/0094903 A1 | 3/2024 | Kavirayani et al. | |
| 2024/0385771 A1* | 11/2024 | Cariello ................ | G06F 3/0679 |

OTHER PUBLICATIONS

Yangsun Lee et al., "Mapping granularity and performance tradeoffs for solid state drive", The Journal of Supercomputing, Springer. com, Jun. 9, 2012.

* cited by examiner

*Primary Examiner* — Mardochee Chery
(74) *Attorney, Agent, or Firm* — PEARL COHEN ZEDEK LATZER BARATZ LLP

(57)          ABSTRACT

An apparatus includes a memory array including blocks of non-volatile memory cells and a control circuit coupled to the memory array. The control circuit is configured to receive first write commands, determine that the first write commands satisfy predetermined criteria, and process the first write commands by: statically mapping the logical block addresses to corresponding physical block addresses of first ones of the blocks of non-volatile memory cells, and writing data from the first write commands to the first ones of the blocks.

19 Claims, 26 Drawing Sheets of
memory
cells

Er

P

Vth

Vcgr   Vv of
memory
cells

Er

A

B

C

Vth

Vva

Vvb

Vvc

Vra

Vrb

Vrc

BLOCK 1500

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |

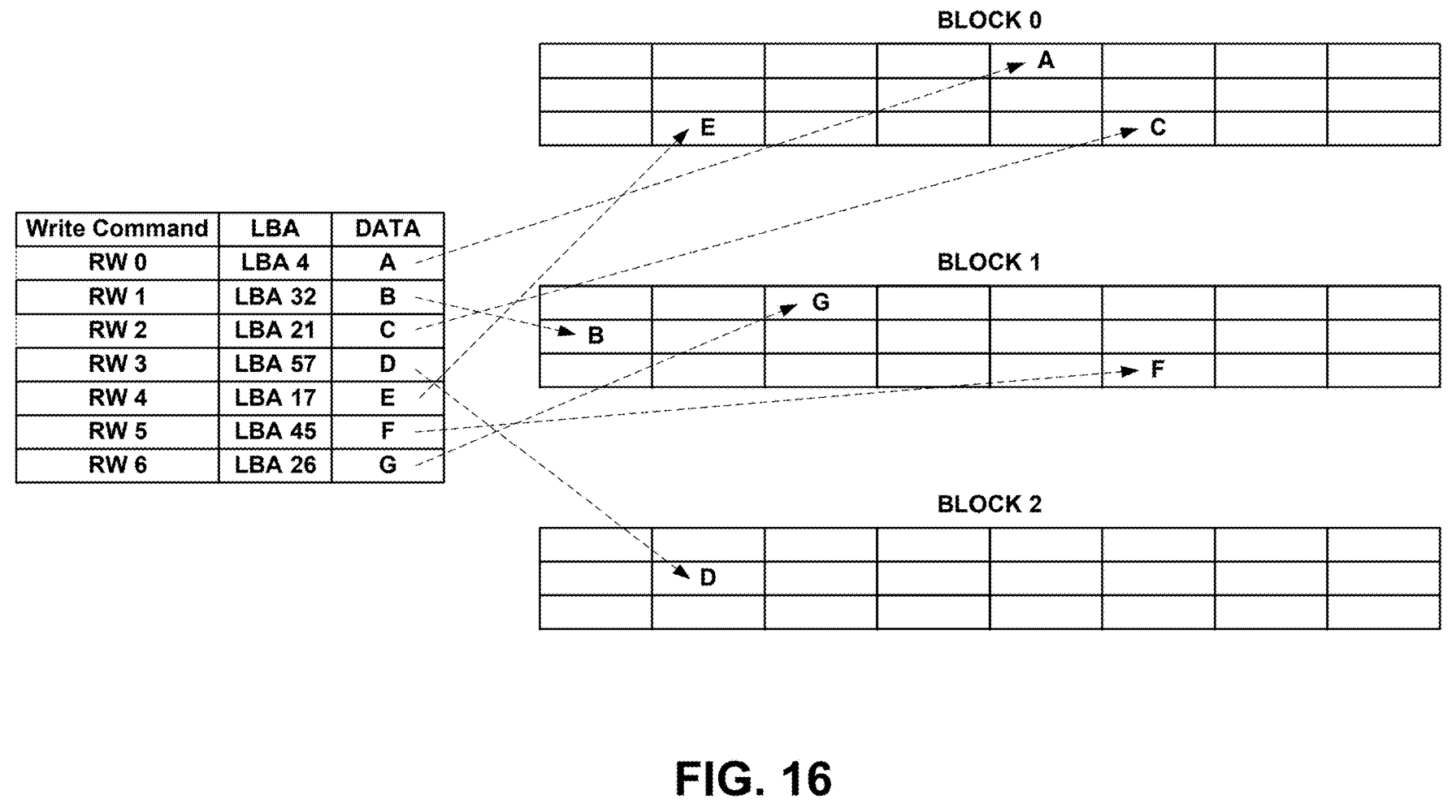

BLOCK 0

BLOCK 1

BLOCK 2

A

C

E

G

B

F

D

| Write Command | LBA | DATA |
|---|---|---|
| RW 0 | LBA 4 | A |
| RW 1 | LBA 32 | B |
| RW 2 | LBA 21 | C |
| RW 3 | LBA 57 | D |
| RW 4 | LBA 17 | E |
| RW 5 | LBA 45 | F |
| RW 6 | LBA 26 | G |

FIG. 16

APPARATUS AND METHODS FOR STATICALLY MAPPING RANDOM WRITE COMMAND DATA

BACKGROUND

Memory is widely used in various electronic devices such as cellular telephones, digital cameras, personal digital assistants, medical electronics, computing devices, and data servers. Memory may include nonvolatile memory or volatile memory. A nonvolatile memory allows information to be stored and retained even when the nonvolatile memory is not connected to a power source (e.g., a battery).

Examples of nonvolatile memory include resistive random access memory ("ReRAM"), magnetoresistive random access memory ("MRAM", ferroelectric random access memory ("FeRAM"), phase change memory ("PCM"), Selector-Only Memory ("SOM"), and the like.

Input/output operations per second ("IOPS") is a performance measurement used to characterize memory systems. Random IOPS (accessing locations on a storage device in a non-contiguous manner) is one benchmark commonly used to categorize memory systems. It is desirable for memory systems to have high random IOPS. For low cost non-volatile memory systems, however, achieving high random IOPS is difficult.

BRIEF DESCRIPTION OF THE DRAWINGS

Like-numbered elements refer to common components in the different figures.

FIG. 16 is a diagram depicting a mapping of an example host write workload.

DETAILED DESCRIPTION

Some non-volatile storage devices require low-cost implementations. To meet these requirements, memory controllers for such low-cost non-volatile storage devices typically are restricted to having a single processor, a limited amount of RAM, relatively low processing power, and no hardware acceleration or automation. Nevertheless, achieving high random IOPS is desirable, even in low-cost non-volatile storage devices.

To address the above-described issues, a non-volatile storage device is proposed that includes a plurality of memory die, and a controller coupled to the plurality of memory die. The controller may be a low-cost controller (e.g., including a single processor, a limited amount of RAM, relatively low processing power, and no hardware automation) and is configured to selectively process host write commands that satisfy predetermined criteria.

In an embodiment, the controller is configured to receive host write commands, and determine whether the write commands only include non-repeating, non-overlapping, random write commands. If so, in an embodiment the controller processes the host write commands by statically mapping a range of logical block addresses of the host write commands to corresponding physical block addresses of blocks of non-volatile memory cells that are configured to store one bit of data per memory cell. In an embodiment, the controller then writes data from the host write commands to the blocks using partial page programming and the static mapping, as described in more detail below.

Without wanting to be bound by any particular theory, it is believed that the described technology avoids logical to physical address updates during targeted random write workloads (e.g., non-repeating, non-overlapping random write workloads).

Without wanting to be bound by any particular theory, it is believed that the described technology may require significantly less processing requirements and may improve random write IOPS.

Without wanting to be bound by any particular theory, it is believed that the described technology facilitates direct mapping of logical block addresses to locations in physical blocks.

Without wanting to be bound by any particular theory, it is believed that this may avoid higher RAM budget requirements to accumulate updates of random write workloads, especially long range random write workloads.

Without wanting to be bound by any particular theory, it is believed that the described technology may provide similar performance across long range workloads without high RAM requirements for logical to physical address updates.

Figure 1:
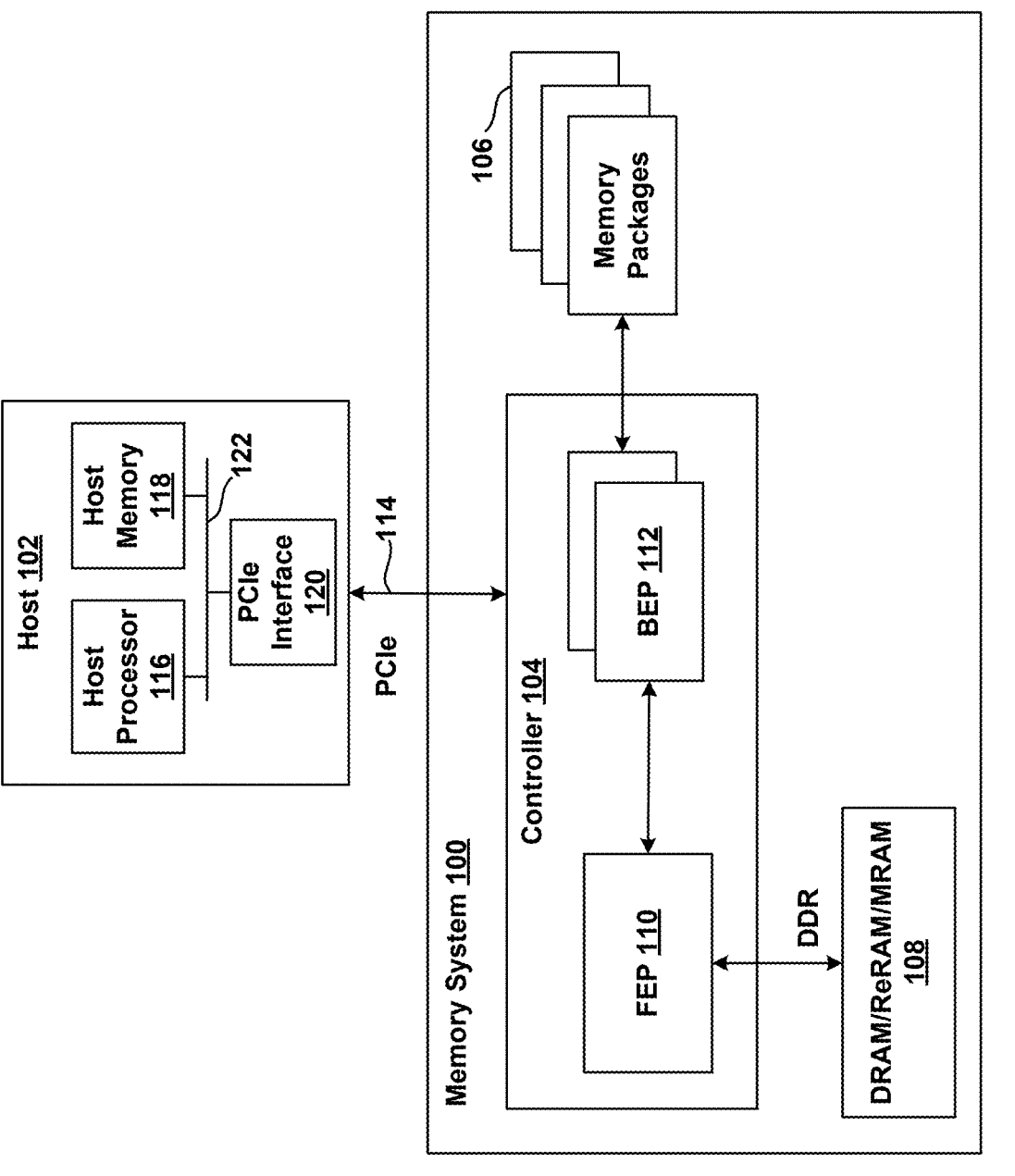
FIG. 1 is a block diagram of an embodiment of a memory system connected to a host.

FIG. 1 is a block diagram of an embodiment of a memory system 100 connected to a host 102. Memory system 100 is an example memory system that can implement the technology described herein. Example memory systems include solid state drives ("SSDs"), memory cards including dual in-line memory modules ("DIMMs") for DRAM replacement, and embedded memory devices. However, other types of memory systems also can be used.

Memory system 100 includes a controller 104, one or more nonvolatile memory packages 106 for storing data, and local memory (e.g., DRAM/ReRAM/MRAM) 108. Controller 104 includes a Front End Processor ("FEP") circuit 110 and one or more Back End Processor ("BEP") circuits 112. In an embodiment FEP circuit 110 is implemented on an Application Specific Integrated Circuit ("ASIC"). In an embodiment, each BEP circuit 112 is implemented on a separate ASIC. In other embodiments, a unified controller ASIC can combine both the front end and back end functions.

The ASICs for each BEP circuit 112 and FEP circuit 110 are implemented on the same semiconductor such that controller 104 is manufactured as a System on a Chip ("SoC"). FEP circuit 110 and BEP circuit 112 both include their own processors. In an embodiment, FEP circuit 110 and BEP circuit 112 work as a master slave configuration where FEP circuit 110 is the master and each BEP circuit 112 is a slave.

For example, FEP circuit 110 implements a Flash Translation Layer ("FTL") or Media Management Layer ("MML") that performs memory management (e.g., garbage collection, wear leveling, etc.), logical to physical ("L2P") address translation, communication with the host, management of DRAM (local volatile memory) and management of the overall operation of the SSD (or other nonvolatile storage system).

BEP circuit 112 manages memory operations in the memory packages/die at the request of FEP circuit 110. For example, BEP circuit 112 can carry out the read, erase, and programming processes. Additionally, BEP circuit 112 can perform buffer management, set specific voltage levels required by FEP circuit 110, perform error correction, control the Toggle Mode interfaces to the memory packages, etc. In an embodiment, each BEP circuit 112 is responsible for its own set of memory packages.

In an embodiment, each nonvolatile memory package 106 includes one or more memory die. Therefore, controller 104 is connected to one or more nonvolatile memory die. In an embodiment, each memory die in nonvolatile memory packages 106 utilize NAND flash memory (including two dimensional NAND flash memory and/or three dimensional NAND flash memory).

In other embodiments, a nonvolatile memory package 106 can include other types of memory, such as storage class memory ("SCM") based on resistive random access memory (such as ReRAM, MRAM, FeRAM) or a PCM. In other embodiments, FEP circuit 110 or BEP circuit 112 can be included on the memory die.

Controller 104 communicates with host 102 via an interface 114 that implements a protocol such as, for example, NVM Express ("NVMe") or Compute Express Link ("CXL") over PCI Express ("PCIe") or using JEDEC standard Double Data Rate or Low-Power Double Data Rate ("DDR" or "LPDDR") interface such as DDR5 or LPDDR5.

For working with memory system 100, host 102 includes a host processor 116, host memory 118, and a PCIe interface 120 connected along bus 122. Host memory 118 is physical memory, and can be DRAM, SRAM, MRAM, nonvolatile memory, or another type of storage. Host 102 is external to and separate from memory system 100. In an embodiment, memory system 100 is embedded in host 102.

Figure 2:
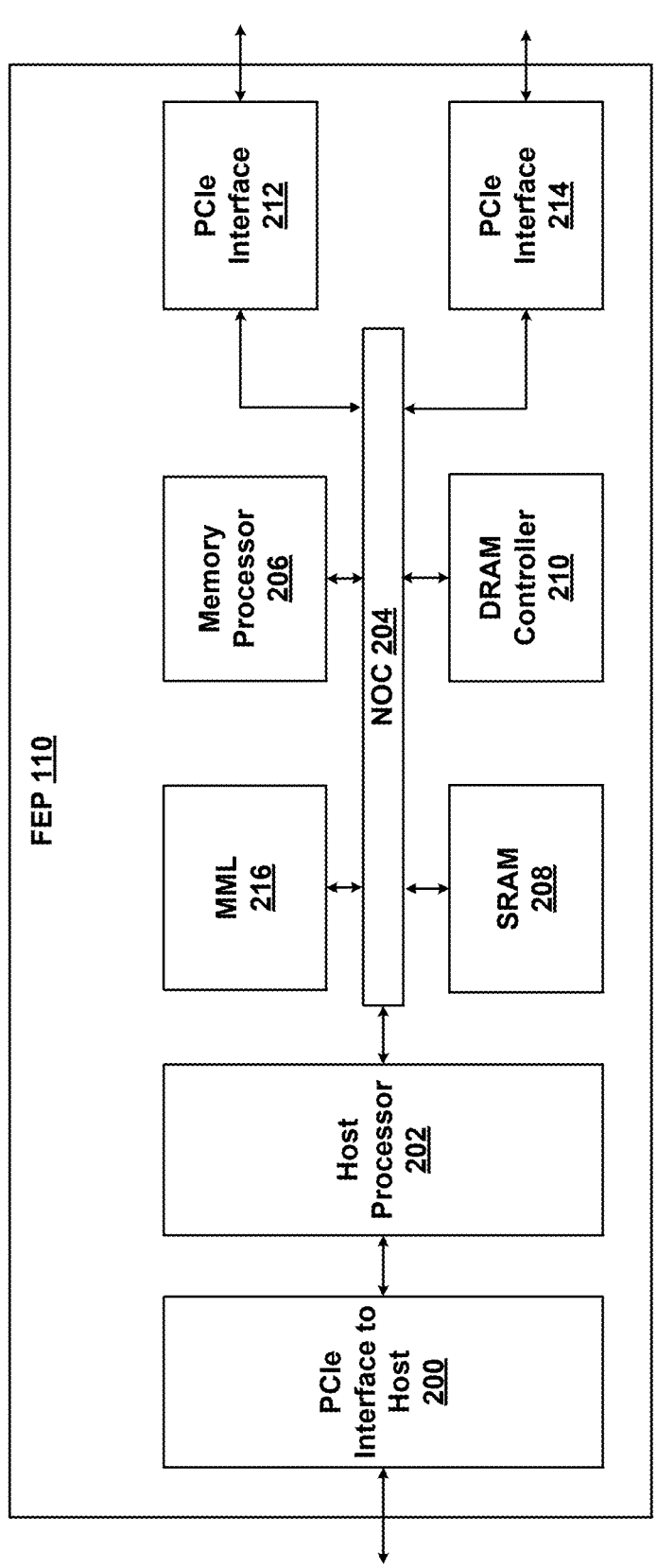
FIG. 2 is a block diagram of an embodiment of a Front End Processor Circuit. In some embodiments, the Front End Processor Circuit is part of a Controller.

FIG. 2 is a block diagram of an embodiment of FEP circuit 110. FIG. 2 shows a PCIe interface 200 to communicate with host 102 (FIG. 1) and a host processor 202 in communication with PCIe interface 200. Host processor 202 can be any type of processor known in the art that is suitable for the implementation.

Host processor 202 is in communication with a network-on-chip ("NOC") 204. A NOC is a communication subsystem on an integrated circuit, typically between cores in a SoC. NOCs can span synchronous and asynchronous clock domains or use un-clocked asynchronous logic. NOC technology applies networking theory and methods to on-chip communications and brings notable improvements over conventional bus and crossbar interconnections.

NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges).

Connected to and in communication with NOC 204 is a memory processor 206, SRAM 208 and a DRAM controller 210. DRAM controller 210 is used to operate and communicate with DRAM (e.g., DRAM 108 of FIG. 1). SRAM 208 is local RAM memory used by memory processor 206. Memory processor 206 is used to run the FEP circuit and perform various memory operations.

Also in communication with the NOC are two PCIe Interfaces 212 and 214. In the embodiment of FIG. 2, the SSD controller will include two BEP circuits 112. Therefore, there are two PCIe Interfaces 212/214. Each PCIe Interface communicates with one of the BEP circuits 112. In other embodiments, there can be more or less than two BEP circuits 112, and thus there can be more than two PCIe Interfaces.

FEP circuit 110 also can include an FTL or, more generally, an MML 216 that performs memory management (e.g., garbage collection, wear leveling, load balancing, etc.), L2P address translation, communication with the host, management of DRAM (local volatile memory) and management of the overall operation of the SSD or other nonvolatile storage system.

Media management layer MML 216 may be integrated as part of the memory management that may handle memory errors and interfacing with the host. In particular, MML may be a module in FEP circuit 110 and may be responsible for the internals of memory management. In particular, MML 216 may include an algorithm in the memory device firmware which translates writes from the host into writes to the memory structure of a die.

MML 216 may be needed because: 1) the memory may have limited endurance, 2) the memory structure may only be written in multiples of pages, and/or 3) the memory structure may not be written unless it is erased as a block. MML 216 understands these potential limitations of the memory structure which may not be visible to the host. Accordingly, MML 216 attempts to translate the writes from host into writes into the memory structure.

Figure 3:
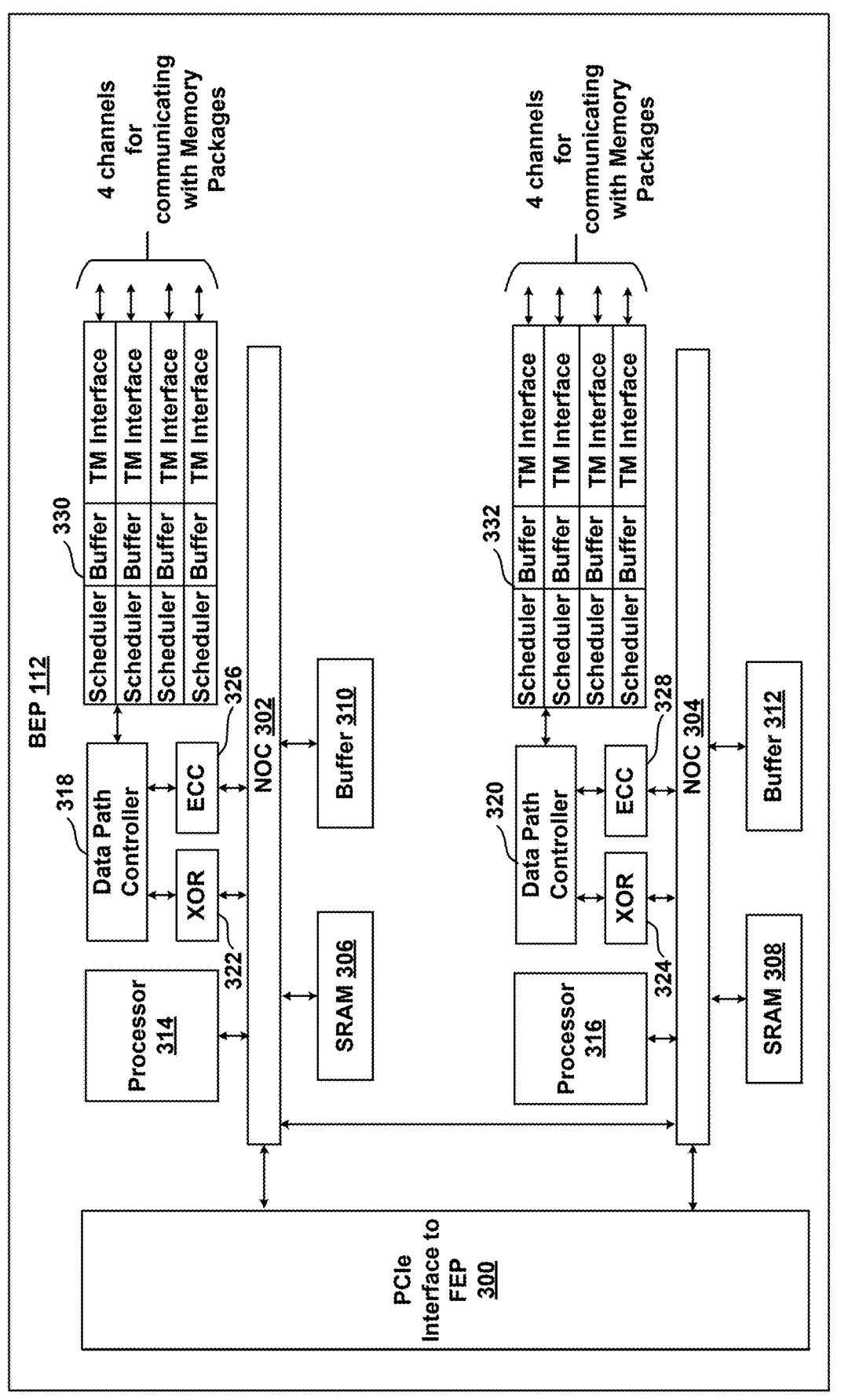
FIG. 3 is a block diagram of an embodiment of a Back End Processor Circuit. In some embodiments, the Back End Processor Circuit is part of a Controller.

FIG. 3 is a block diagram of an embodiment of BEP circuit 112. FIG. 3 shows a PCIe Interface 300 for communicating with FEP circuit 110 (e.g., communicating with one of PCIe Interfaces 212 and 214 of FIG. 2). PCIe Interface 300 is in communication with two NOCs 302 and 304. In an embodiment, NOCs 302 and 304 can be combined into one large NOC.

Each NOC 302/304 is connected to SRAM (306/308), a buffer (310/312), a processor (314/316), and a data path controller (318/320) via an XOR engine (322/324) and an error correction code ("ECC") engines (326/328). ECC engines 326/328 are used to perform error correction, as known in the art. XOR engines 322/324 are used to XOR the data so that data can be combined and stored in a manner that can be recovered in case there is a programming error.

Data path controller 318 is connected to an interface module for communicating via four channels with memory packages. Thus, top NOC 302 is associated with an interface 330 for four channels for communicating with memory packages, and bottom NOC 304 is associated with an interface 332 for four additional channels for communicating with memory packages.

Each interface 330/332 includes four Toggle Mode Interfaces ("TM Interface"), four buffers and four schedulers. There is one scheduler, buffer, and TM Interface for each of the channels. Processor 314/316 can be any standard processor known in the art. Data path controllers 318/320 can be a processor, FPGA, microprocessor, or other type of controller.

XOR engines 322/324 and ECC engines 326/328 are dedicated hardware circuits, known as hardware accelerators. In other embodiments, XOR engines 322/324 and ECC engines 326/328 can be implemented in software. The scheduler, buffer, and TM Interfaces are hardware circuits.

Figure 4:
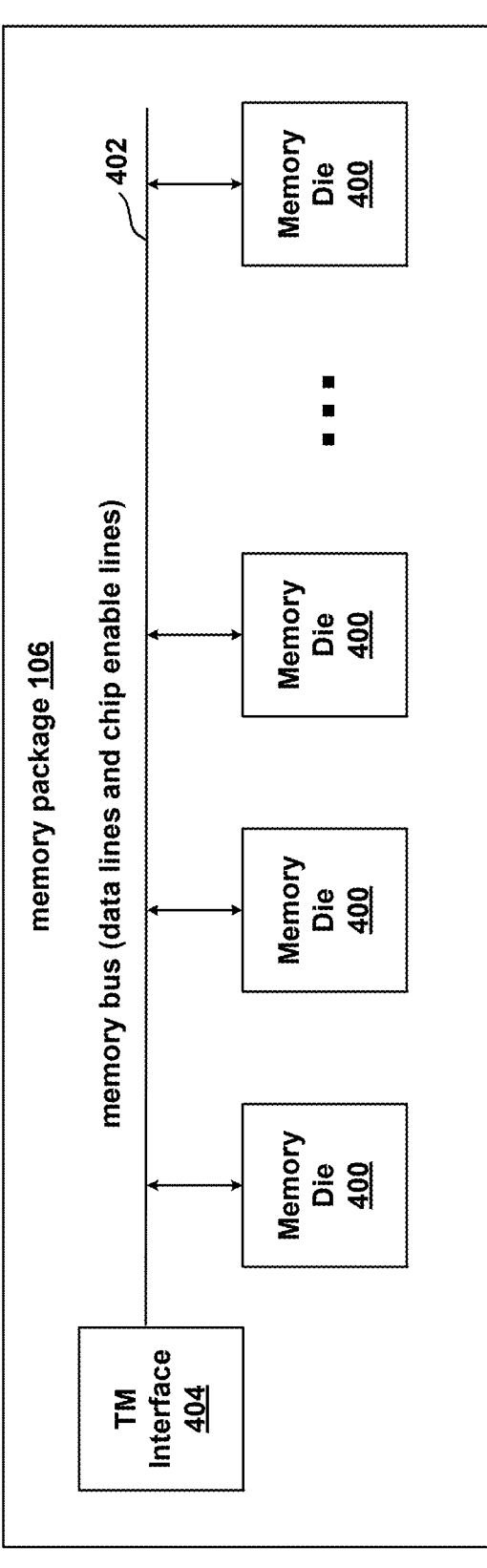
FIG. 4 is a block diagram of an embodiment of a memory package.

FIG. 4 is a block diagram of an embodiment of a nonvolatile memory package 106 that includes a plurality of memory die 400 connected to a memory bus (data lines and chip enable lines) 402. Memory bus 402 connects to a TM Interface 404 for communicating with the TM Interface of a BEP circuit 112 (see, e.g., FIG. 3).

In some embodiments, nonvolatile memory package 106 can include a small controller connected to memory bus 402 and TM Interface 404. Nonvolatile memory package 106 can have one or more memory die 400. In an embodiment, each nonvolatile memory package 106 includes eight or 16 memory die 400. However, other numbers of memory die 400 also can be implemented.

In another embodiment, TM Interface 404 is instead a JEDEC standard DDR or LPDDR with or without variations such as relaxed time-sets or smaller page size. The technology described herein is not limited to any particular number of memory die 400.

Figure 5A:
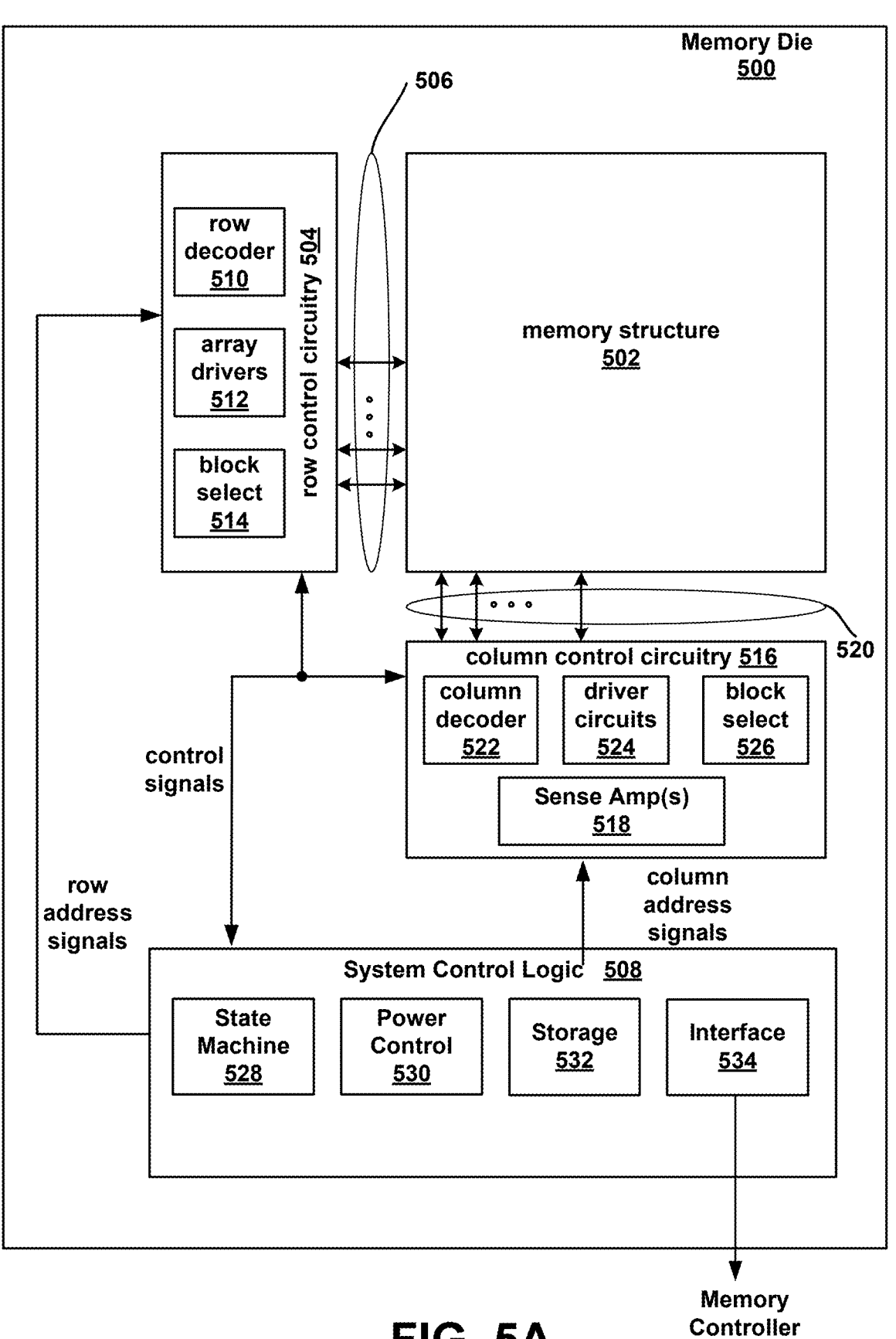
FIG. 5A is a block diagram of one embodiment of a memory die.

Referring again to FIG. 1, in an embodiment each nonvolatile memory package 106 includes one or more memory die. FIG. 5A is a functional block diagrams of an embodiment of a memory die 500. Each of the one or more memory die of nonvolatile memory package 106 can be implemented as memory die 500 of FIG. 5A. The components depicted in FIG. 5A are electrical circuits.

Memory die 500 includes a memory structure 502 that can include non-volatile memory cells, as described in more detail below. The array terminal lines of memory structure 502 include the various layer(s) of word lines organized as rows, and the various layer(s) of bit lines organized as columns. However, other orientations also can be implemented.

Memory die 500 includes row control circuitry 504, whose outputs 506 are connected to respective word lines of the memory structure 502. Row control circuitry 504 receives a group of M row address signals and one or more various control signals from system control logic circuit 508, and typically may include such circuits as row decoders 510, array terminal drivers 512, and block select circuitry 514 for both reading and writing (programming) operations.

Row control circuitry 504 also may include read/write circuitry. Memory die 500 also includes column control circuitry 516 including sense amplifier(s) 518 whose input/outputs 520 are connected to respective bit lines of memory structure 502. Although only a single block is shown for memory structure 502, a memory die can include multiple arrays that can be individually accessed.

Column control circuitry 516 receives a group of N column address signals and one or more various control signals from system control logic 508, and typically may include such circuits as column decoders 522, array terminal receivers or driver circuits 524, block select circuitry 526, as well as read/write circuitry, and I/O multiplexers.

System control logic 508 receives data and commands from memory controller 104 (FIG. 1) and provides output data and status to host 102. In some embodiments, system control logic 508 (which includes one or more electrical circuits) includes a state machine 528 that provides die-level control of memory operations.

In one embodiment, state machine 528 is programmable by software. In other embodiments, state machine 528 does not use software and is completely implemented in hardware (e.g., electrical circuits). In another embodiment, state machine 528 is replaced by a micro-controller or microprocessor, either on or off the memory chip.

System control logic 508 also can include a power control module 530 that controls the power and voltages supplied to the rows and columns of memory structure 502 during memory operations and may include charge pumps and regulator circuit for creating regulating voltages. System control logic 508 includes storage 532 (e.g., RAM, registers, latches, etc.), which may be used to store parameters for operating memory structure 502.

Commands and data are transferred between memory controller 104 and memory die 500 via memory controller interface 534 (also referred to as a "communication interface"). Memory controller interface 534 is an electrical interface for communicating with memory controller 104. Examples of memory controller interface 534 include a Toggle Mode Interface, a DDR interface and an Open NAND Flash Interface ("ONFI"). Other I/O interfaces also can be used. In a DDR clock scheme, rising edges and falling edges of a clock signal are sampling transitions.

In some embodiments, all elements of memory die 500, including the system control logic 508, can be formed as part of a single die. In other embodiments, some or all of the system control logic 508 can be formed on a different die.

In an embodiment, memory structure 502 is a three-dimensional memory array of non-volatile memory cells in which multiple memory levels are formed above a single substrate, such as a wafer. Memory structure 502 may include any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 502 includes a two-dimensional memory array of non-volatile memory cells. In one example, the non-volatile memory cells are NAND flash memory cells utilizing floating gates. Other types of memory cells (e.g., NOR-type flash memory) also can be used.

The exact type of memory array architecture or memory cell included in memory structure 502 is not limited to the examples above. Many different types of memory array architectures or memory technologies can be used to form memory structure 502. No particular non-volatile memory technology is required for purposes of the new claimed embodiments proposed herein.

Other examples of suitable technologies for memory cells of memory structure 502 include ReRAM, MRAM, Spin Transfer Torque MRAM, Spin Orbit Torque MRAM, FeRAM), PCM, and the like. Examples of suitable technologies for memory cell architectures of memory structure 502 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element also may be referred to as a programmable metallization cell.

A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is MRAM that stores data by magnetic storage elements. The elements are formed from two ferromagnetic layers, each of which can hold a magnetization, separated by a thin insulating layer. One of the two layers is a permanent magnet set to a particular polarity, and the magnetization of the other layer can be changed to match that of an external field to store memory. A memory device is built from a grid of such memory cells.

In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

PCM exploits the unique behavior of chalcogenide glass. One embodiment uses a GeTe—$Sb_2Te_3$ super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light.

In other PCM embodiments, the memory cells are programmed by current pulses. Note that the use of "pulse" in this document does not require a square pulse but includes a (continuous or non-continuous) vibration or burst of sound, current, voltage light, or another wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 5A can be grouped into two parts: (1) memory structure 502 and (2) peripheral circuitry, which includes all of the other components depicted in FIG. 5A. An important characteristic of a memory circuit is its capacity, which can be increased by increasing the area of the memory die of storage system 100 that is given over to memory structure 502. However, this reduces the area of the memory die available for the peripheral circuitry. This can place quite severe restrictions on these elements of the peripheral circuitry.

For example, the need to fit sense amplifier circuits within the available area can be a significant restriction on sense amplifier design architectures. With respect to system control logic 508, reduced availability of area can limit the available functions that can be implemented on-chip. Consequently, a basic trade-off in the design of a memory die for the storage system 100 is the amount of area to devote to memory structure 502 and the amount of area to devote to the peripheral circuitry.

Another area in which memory structure 502 and the peripheral circuitry are often at odds is in the processing involved in forming these regions, since these regions often involve differing processing technologies and the trade-off in having differing technologies on a single die. For example, when the memory structure 502 is NAND flash, this is an NMOS structure, while the peripheral circuitry is often CMOS based.

For example, elements such sense amplifier circuits, charge pumps, logic elements in a state machine, and other peripheral circuitry in system control logic 508 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 5A onto separately formed die that are then bonded together. More specifically, memory structure 502 can be formed on one die (referred to as the memory die) and some or all of the peripheral circuitry elements, including one or more control circuits, can be formed on a separate die (referred to as the control die).

For example, a memory die can be formed of just the memory elements, such as the array of memory cells of flash NAND memory, MRAM, PCM, ReRAM, or other memory type. Some or all of the peripheral circuitry, even including elements such as decoders and sense amplifiers, can then be moved on to a separate control die. This allows each of the memory die to be optimized individually according to its technology.

For example, a NAND memory die can be optimized for an NMOS based memory array structure, without worrying about the CMOS elements that have now been moved onto a control die that can be optimized for CMOS processing.

This allows more space for the peripheral elements, which can now incorporate additional capabilities that could not be readily incorporated were they restricted to the margins of the same die holding the memory cell array.

The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

Figure 5B:
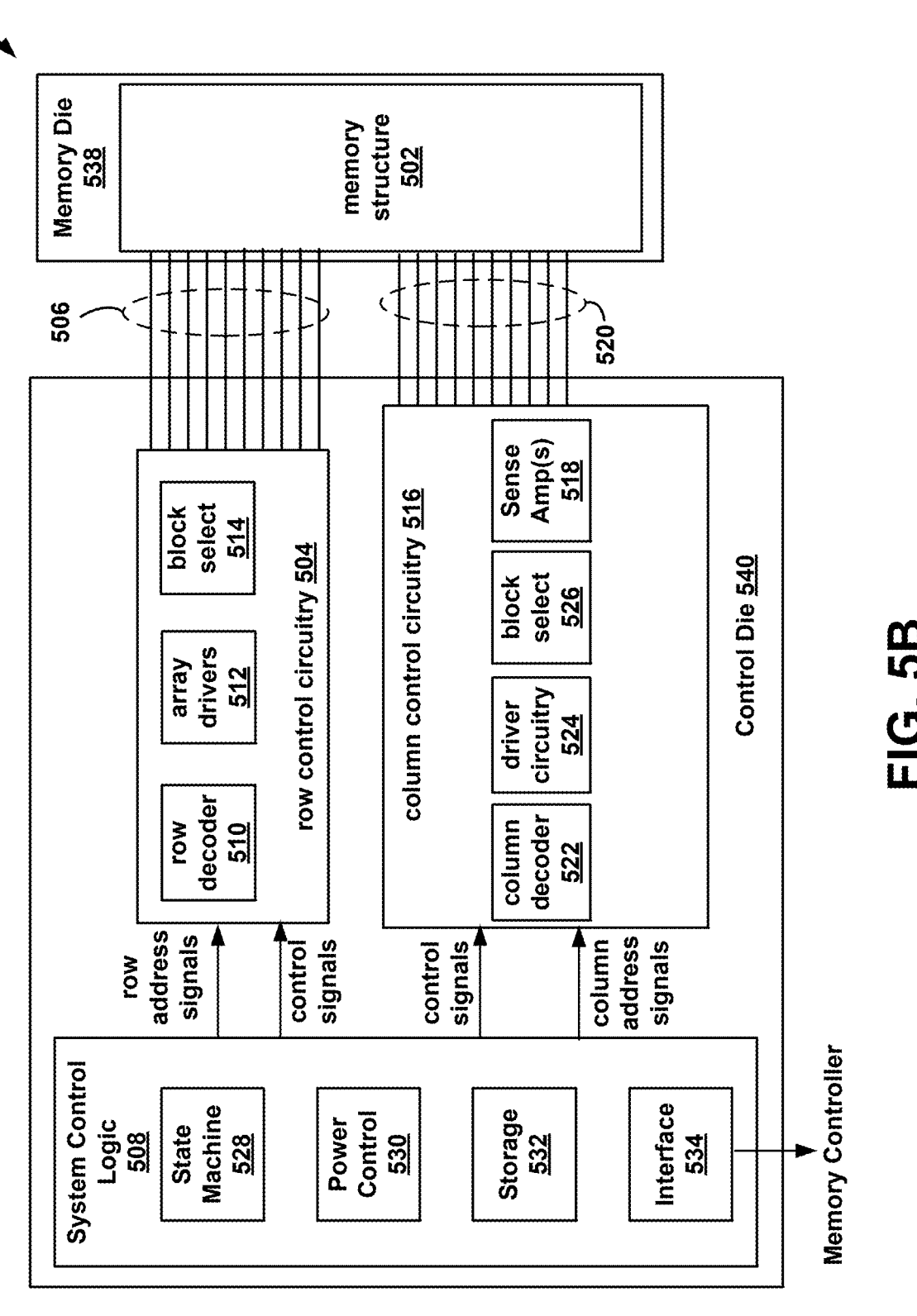
FIG. 5B is a block diagram of one embodiment of an integrated memory assembly.

FIG. 5B shows an alternative arrangement to that of FIG. 5A which may be implemented using wafer-to-wafer bonding to provide a bonded die pair. FIG. 5B depicts a functional block diagram of one embodiment of an integrated memory assembly 536. One or more integrated memory assemblies 536 may be used to implement nonvolatile memory package 106 of storage system 100.

Integrated memory assembly 536 includes two types of semiconductor die (or more succinctly, "die"). Memory die 538 includes memory structure 502. Memory structure 502 includes non-volatile memory cells. Control die 540 includes control circuitry 508, 516, and 504 (as described above). In some embodiments, control die 540 is configured to connect to memory structure 502 in memory die 538. In some embodiments, memory die 538 and control die 540 are bonded together.

FIG. 5B shows an example of the peripheral circuitry, including control circuits, formed in a peripheral circuit or control die 540 coupled to memory structure 502 formed in memory die 538. Common components are labelled similarly to FIG. 5A. System control logic 508, row control circuitry 504, and column control circuitry 516 are located in control die 540. In some embodiments, all or a portion of column control circuitry 516 and all or a portion of row control circuitry 504 are located on memory die 538. In some embodiments, some of the circuitry in system control logic 508 is located on memory die 538.

System control logic 508, row control circuitry 504, and column control circuitry 516 may be formed by a common process (e.g., CMOS process), so that adding elements and functions, such as ECC, more typically found on a memory controller 104 may require few or no additional process steps (i.e., the same process steps used to fabricate controller 104 also may be used to fabricate system control logic 508, row control circuitry 504, and column control circuitry 516).

Thus, while moving such circuits from a die such as memory 538 may reduce the number of steps needed to fabricate such a die, adding such circuits to a die such as control die 540 may not require many additional process steps. Control die 540 also could be referred to as a CMOS die, due to the use of CMOS technology to implement some or all of control circuitry 504, 508, 516.

FIG. 5B shows column control circuitry 516 including sense amplifier(s) 518 on control die 540 coupled to memory structure 502 on memory die 538 through electrical paths 520. For example, electrical paths 520 may provide electrical connection between column decoder 522, driver circuitry 524, and block select 526 and bit lines of memory structure 502.

Electrical paths may extend from column control circuitry 516 in control die 540 through pads on control die 540 that are bonded to corresponding pads of the memory die 538, which are connected to bit lines of memory structure 502. Each bit line of memory structure 502 may have a corresponding electrical path in electrical paths 520, including a pair of bond pads, which connects to column control circuitry 516.

Similarly, row control circuitry 504, including row decoder 510, array drivers 512, and block select 514 are coupled to memory structure 502 through electrical paths 506. Each of electrical path 506 may correspond to a word line, dummy word line, or select gate line. Additional electrical paths also may be provided between control die 540 and memory die 538.

For purposes of this document, the phrases "a control circuit" or "one or more control circuits" can include any one of or any combination of memory controller 104, state machine 528, all or a portion of system control logic 508, all or a portion of row control circuitry 504, all or a portion of column control circuitry 516, a microcontroller, a microprocessor, and/or other similar functioned circuits.

The control circuit can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

In some embodiments, there is more than one control die 540 and more than one memory die 538 in an integrated memory assembly 536. In some embodiments, the integrated memory assembly 536 includes a stack of multiple control die 540 and multiple memory die 538.

Figure 5C:
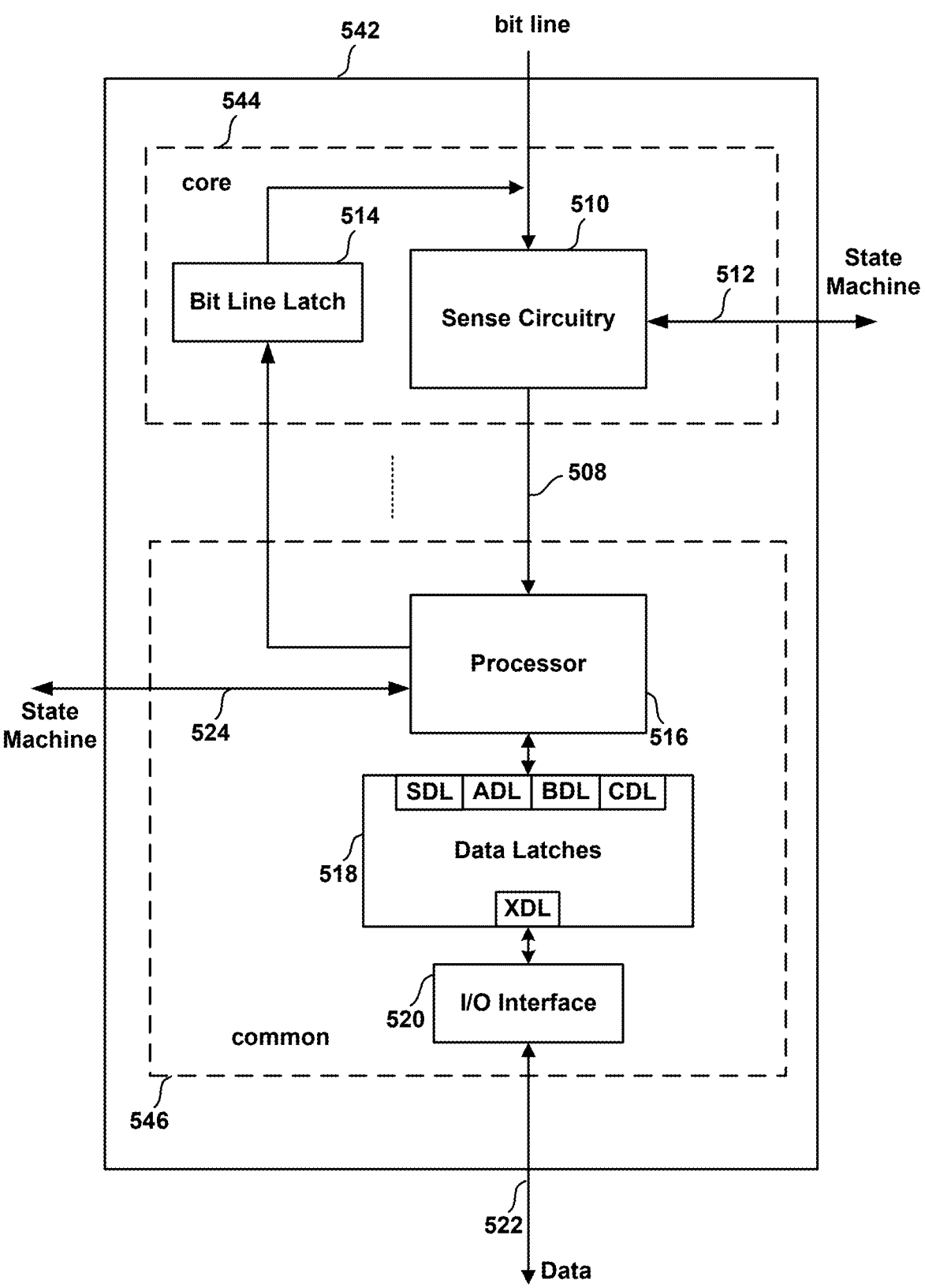
FIG. 5C depicts details of an individual sense block.

FIG. 5C is a block diagram depicting an individual sense block 542 of sense amplifiers 518 partitioned into a core portion 544 (referred to as a sense module 544) and a common portion 546. In an embodiment, there will be a separate sense module 544 for each bit line and one common portion 546 for a set of multiple sense modules 544. In one example, a sense block 542 will include one common portion 546 connected to eight, twelve, or sixteen sense modules 544. Each of sense modules 544 in a group will communicate with the associated common portion 546 via a data bus 508. In an embodiment, sense amplifiers 518 include many sense blocks 542.

Sense module 544 includes sense circuitry 510 that determines whether a conduction current in a connected bit line is above or below a predetermined level or, in voltage based sensing, whether a voltage level in a connected bit line is above or below a predetermined level. Sense circuitry 510 receives control signals from state machine 528 via input lines 512.

In some embodiments, sense circuitry 510 includes a circuit commonly referred to as a sense amplifier. Sense module 544 also includes a bit line latch 514 that is used to set a voltage condition on the connected bit line. For example, a predetermined state latched in bit line latch 514 will result in the connected bit line being pulled to a state designating program inhibit (e.g., VDD).

Common portion 546 includes a processor 516, data latches 518 and an I/O Interface 520 coupled between data latches 518 and data bus 522. Processor 516 performs computations. For example, one of its functions is to determine the data stored in the sensed memory cell and store the determined data in the set of data latches.

Data latches 518 are used to store data bits determined by processor 516 during a read operation. Data latches 518 also are used to store data bits imported from data bus 522 during a program operation. The imported data bits represent write data meant to be programmed into the memory. I/O interface 520 provides an interface between data latches 518 and the data bus 522.

During read or sensing, the operation of the system is under the control of state machine 528 that controls (using power control 530) the supply of different control gate or other bias voltages to the addressed memory cell(s). As sense module 544 steps through the various predefined control gate voltages corresponding to the various memory states supported by the memory, sense module 544 may trip at one of these voltages and an output will be provided from sense module 544 to processor 516 via bus 508.

At that point, processor 516 determines the resultant memory state by consideration of the tripping event(s) of sense module 544 and the information about the applied control gate voltage from the state machine via signal lines 524. Processor 516 then computes a binary encoding for the memory state and stores the resultant data bits into data latches 518. In another embodiment, bit line latch 514 serves double duty, both as a latch for latching the output of the sense module 544 and also as a bit line latch as described above.

Data latch stack 518 contains a stack of data latches corresponding to an associated sense module 544. In an embodiment, there are three, four or another number of data latches per sense module 544. In an embodiment, the latches are each one bit (e.g., one bit per sense module 544). In an embodiment, the latches for each sense module 544 will be referred to as SDL, XDL, ADL, BDL, and CDL.

Thus, in an embodiment, each sense module 544 has its own set of SDL, XDL, ADL, BDL, and CDL. In the embodiments discussed here, latch XDL is a transfer latch used to exchange data with the I/O interface 520. In addition to a first sense amplifier data latch SDL, the additional latches ADL, BDL and CDL can be used to hold data.

During program or verify, the data to be programmed are stored in data latches 518 from data bus 522. During the verify process, processor 516 monitors the verified memory state relative to the desired memory state. When the two are in agreement, processor 516 sets bit line latch 514 to cause the bit line to be pulled to a state designating program inhibit. This inhibits the memory cell coupled to the bit line from further programming even if it is subjected to programming pulses on its control gate. In other embodiments processor 516 initially loads bit line latch 514 and the sense circuitry sets it to an inhibit value during the verify process.

In some implementations (but not required), data latches 518 are implemented as a shift register so that the parallel data stored therein is converted to serial data for data bus 522, and vice versa. In an embodiment, all data latches corresponding to the read/write block of m memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

Figure 6A:
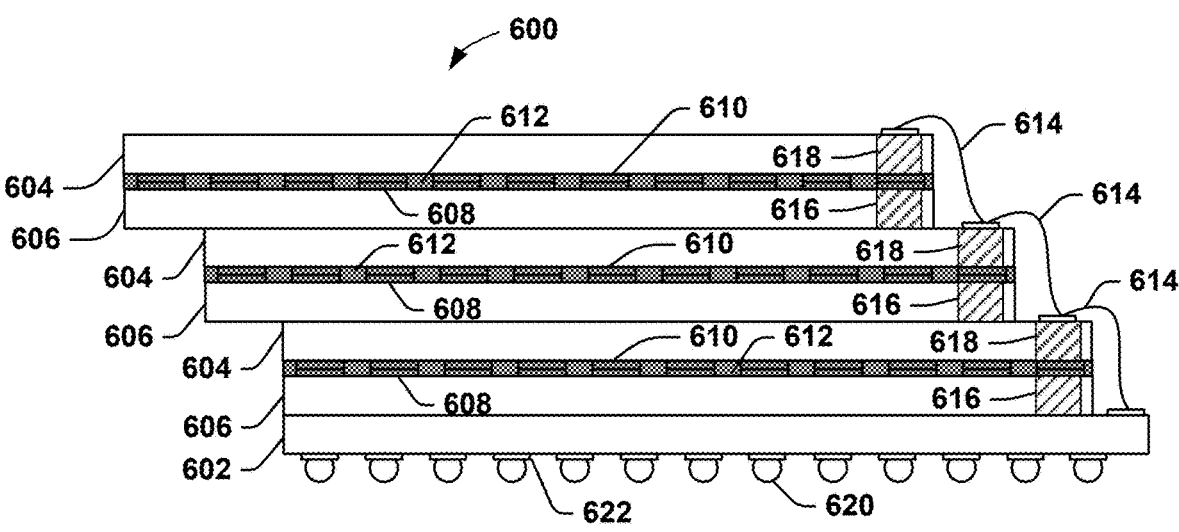
FIGS. 6A and 6B depict different embodiments of integrated memory assemblies.

FIG. 6A depicts a side view of an embodiment of an integrated memory assembly 600 stacked on a substrate 602 (e.g., a stack including control die 604 and memory die 606). The integrated memory assembly 600 has three control die 604 and three memory die 606. In some embodiments, there are more than three memory die 606 and more than three control die 604.

Each control die 604 is affixed (e.g., bonded) to at least one memory die 606. Some of the bond pads 608/610 are depicted, although there may be many more bond pads. A space between two die 604, 606 that are bonded together is filled with a solid layer 612, which may be formed from epoxy or other resin or polymer. This solid layer 612 protects the electrical connections between the die 604, 606, and further secures the die together. Various materials may be used as solid layer 612, but in embodiments, it may be Hysol epoxy resin from Henkel Corp., having offices in California, USA.

Integrated memory assembly 600 may for example be stacked with a stepped offset, leaving the bond pads at each level uncovered and accessible from above. Wire bonds 614 connected to the bond pads connect control die 604 to substrate 602. A number of such wire bonds may be formed across the width of each control die 604 (i.e., into the page of FIG. 6A).

A memory die through silicon via ("TSV") 616 may be used to route signals through each memory die 606. A control die TSV 618 may be used to route signals through each control die 604. The TSVs 616, 618 may be formed before, during or after formation of the integrated circuits in semiconductor die 604, 606. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 620 optionally may be affixed to contact pads 622 on a lower surface of substrate 602. Solder balls 620 may be used to couple integrated memory assembly 600 electrically and mechanically to a host device such as a printed circuit board. Solder balls 620 may be omitted where the integrated memory assembly 600 is to be used as an LGA package. Solder balls 620 may form a part of an interface between integrated memory assembly 600 and memory controller 104 (FIG. 1).

Figure 6B:
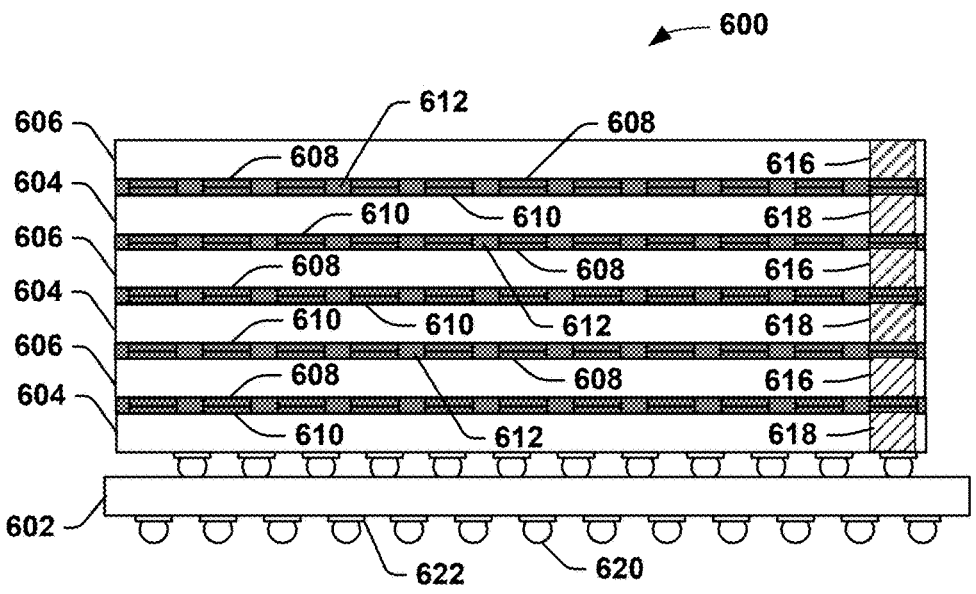

FIG. 6B depicts a side view of another embodiment of an integrated memory assembly 600 stacked on a substrate 602. The integrated memory assembly 600 of FIG. 6B has three control die 604 and three memory die 606. In some embodiments, there are many more than three control die 604 and many more than three memory die 606. In this example, each control die 604 is bonded to at least one memory die 606. Optionally, a control die 604 may be bonded to two or more memory die 606.

Some of bond pads 608, 610 are depicted. There may be many more bond pads. A space between two die 604, 606 that are bonded together is filled with a solid layer 612, which may be formed from epoxy or other resin or polymer. In contrast to the example in FIG. 6A, integrated memory assembly 600 of FIG. 6B does not have a stepped offset. A memory die TSV 616 may be used to route signals through each memory die 606. A control die TSV 618 may be used to route signals through each control die 604.

As has been briefly discussed above, control die 604 and memory die 606 may be bonded together. Bond pads on each control die 604 and each memory die 606 may be used to bond the two die together. In some embodiments, the bond pads are bonded directly to each other, without solder or other added material, in a so-called Cu-to-Cu bonding process.

In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension.

Such bonds may be formed at room temperature, though heat also may be applied. In embodiments using cu-to-cu bonding, the bond pads may be about 5 μm square and spaced from each other with a pitch of 5 μm to 5 μm. Although this process is referred to herein as cu-to-cu bonding, this term also may apply even where the bond pads are formed of materials other than copper.

When the area of bond pads is small, it may be difficult to bond the semiconductor die together. The size of and pitch between bond pads may be further reduced by providing a film layer on the surfaces of the semiconductor die including the bond pads. The film layer is provided around the bond pads. When the die are brought together, the bond pads may bond to each other, and the film layers on the respective die may bond to each other.

Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller (or greater) sizes and pitches.

Some embodiments may include a film on surface of control die 604 and memory die 606. Where no such film is initially provided, a space between the die may be under filled with an epoxy or other resin or polymer. The under-fill material may be applied as a liquid which then hardens into a solid layer. This under-fill step protects the electrical connections between control die 604 and memory die 606, and further secures the die together. Various materials may be used as under-fill material, such as Hysol epoxy resin from Henkel Corp., having offices in California, USA.

Figure 7A:
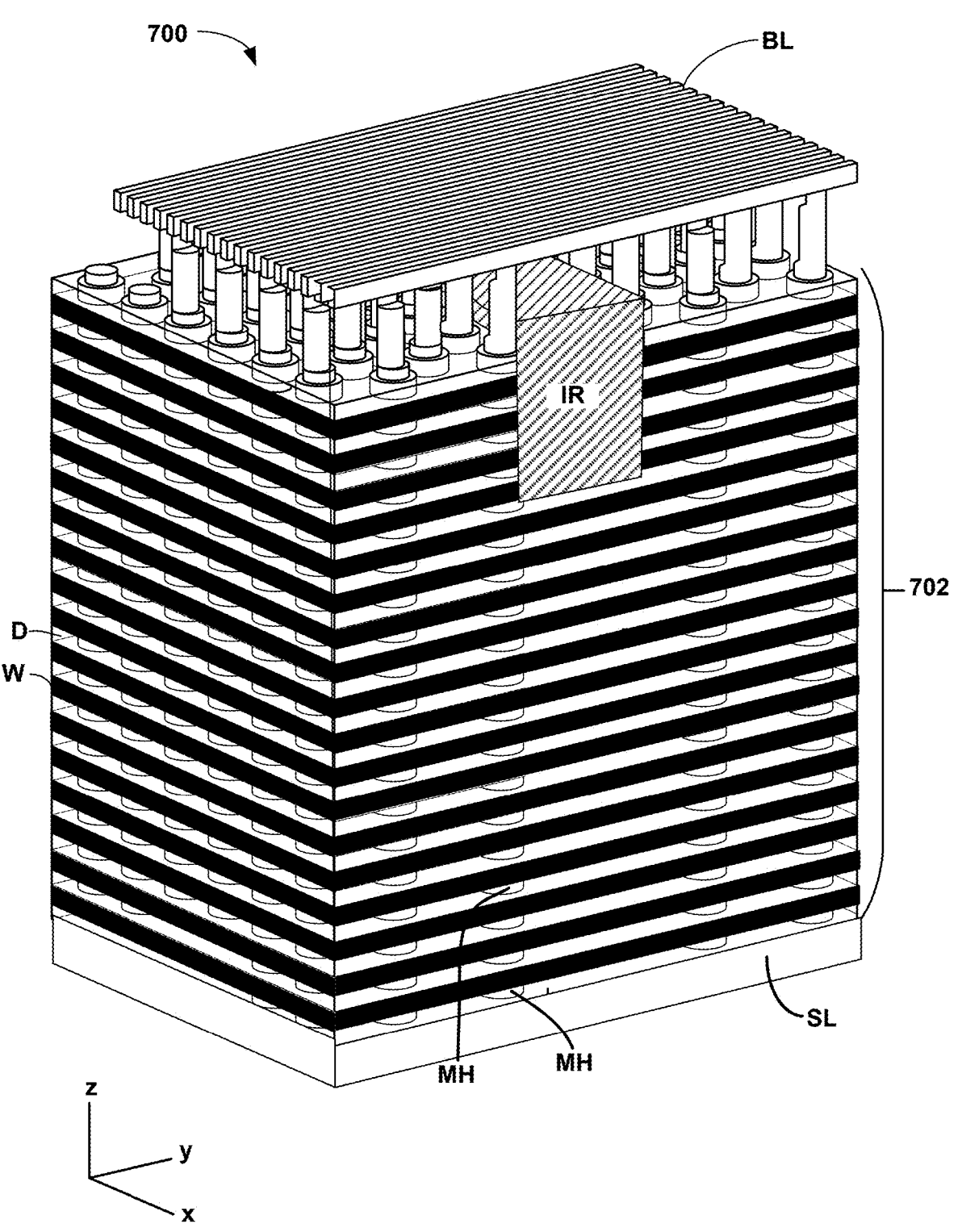
FIG. 7A is a perspective view of a portion of one embodiment of a monolithic three dimensional memory structure.

FIG. 7A is a perspective view of a portion of one example embodiment of a monolithic three dimensional memory array included in memory structure 502, which includes a plurality non-volatile memory cells arranged as vertical NAND strings. For example, FIG. 7A shows a portion 700 of one block of memory.

The structure depicted includes a set of bit lines BL positioned above a stack 702 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements.

As will be explained below, in one embodiment the alternating dielectric layers and conductive layers are divided into four or five (or a different number of) regions by isolation regions IR. FIG. 7A shows one isolation region IR separating two regions. Below the alternating dielectric layers and word line layers is a source line layer SL. Memory holes are formed in the stack of alternating dielectric layers and conductive layers.

For example, one of the memory holes is marked as MH. Note that in FIG. 7A, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells.

Each memory cell can store one or more bits of data. Thus, the non-volatile memory cells are arranged in memory holes. More details of the three dimensional monolithic memory array that includes memory structure 502 is provided below.

Figure 7B:
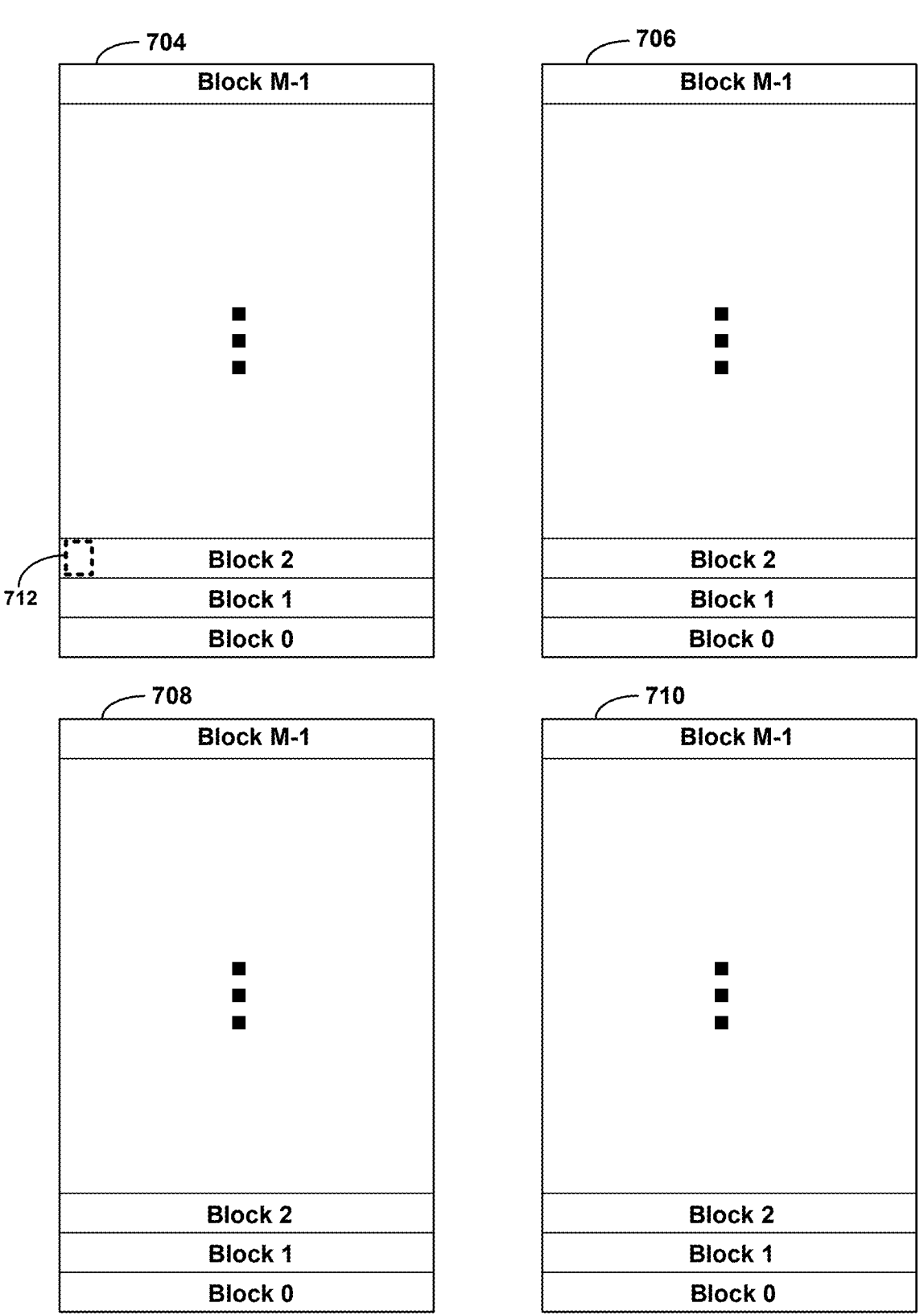
FIG. 7B is a block diagram of one embodiment of a memory structure having four planes.

FIG. 7B is a block diagram explaining one example organization of memory structure 502, which is divided into four planes 704, 706, 708 and 710. Each plane is then divided into M blocks. In one example, each plane has about 200 blocks. However, different numbers of blocks and planes also can be used.

In one embodiment, a block of memory cells is a unit of erase. That is, all memory cells of a block are erased together. In other embodiments, blocks can be divided into sub-blocks and the sub-blocks can be the unit of erase. Memory cells also can be grouped into blocks for other reasons, such as to organize the memory structure to enable the signaling and selection circuits.

In some embodiments, a block represents a groups of connected memory cells as the memory cells of a block share a common set of word lines. For example, the word lines for a block are all connected to all of the vertical NAND strings for that block. Although FIG. 7B shows four planes, more or less than four planes can be implemented. In some embodiments, memory structure 502 includes eight planes.

Each block typically is divided into one or more pages. In an embodiment, a page is a unit of programming/writing and a unit of reading. Other units of programming also can be used. In an embodiment, one or more pages of data are typically stored in one row of memory cells. For example, one or more pages of data may be stored in memory cells connected to a common word line. In an embodiment, a page includes data stored in all memory cells connected to a common word line.

Figure 7C:
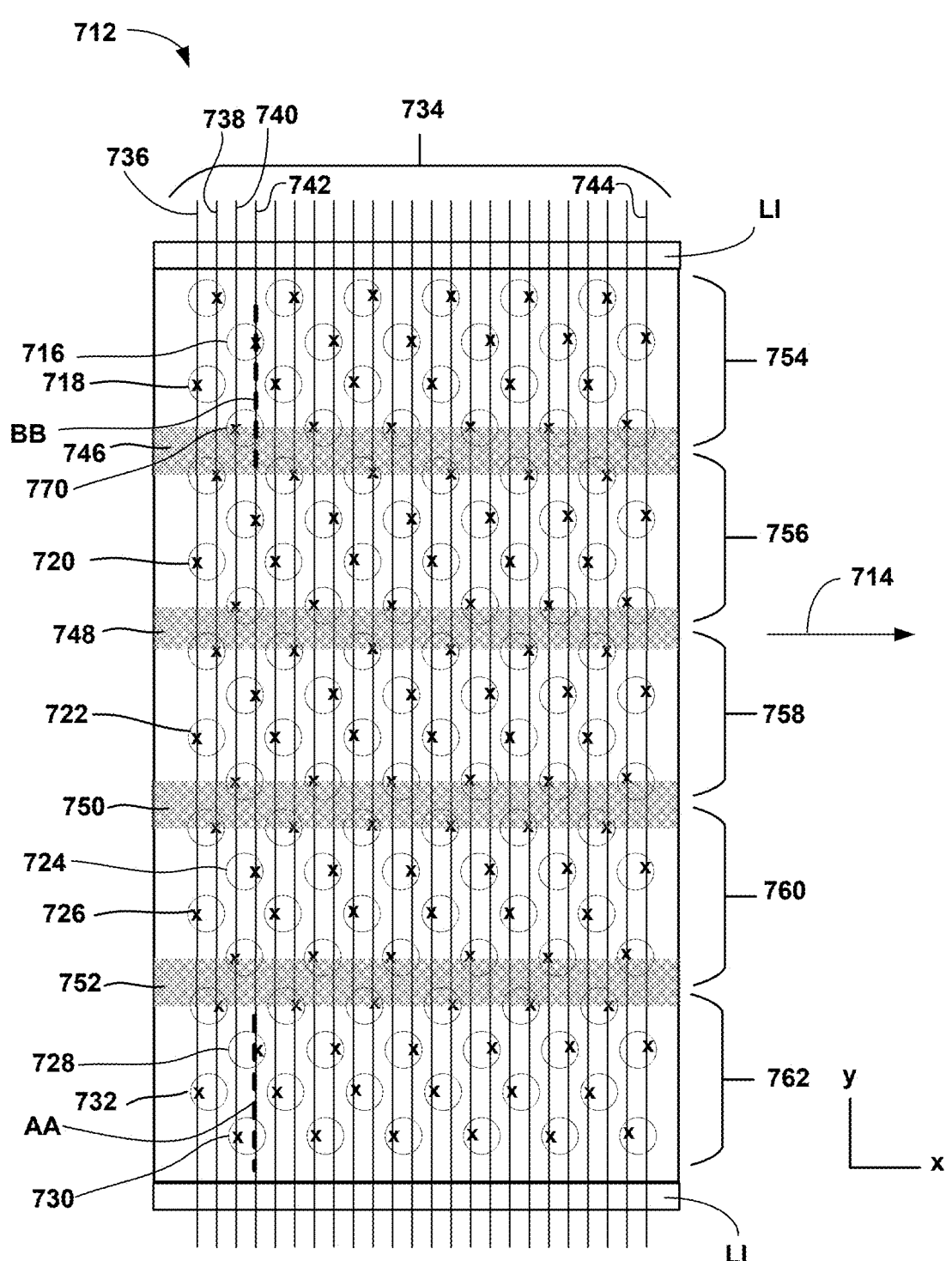
FIG. 7C depicts a top view of a portion of one embodiment of a block of memory cells.

FIGS. 7C-7G depict an example three dimensional ("3D") NAND structure that corresponds to the structure of FIG. 7A and can be used to implement memory structure 502 of FIGS. 5A and 5B. FIG. 7C is a block diagram depicting a top view of a portion 712 of Block 2 of plane 704. As can be seen from FIG. 7C, the block depicted in FIG. 7C extends in the direction 714. In an embodiment, the memory array has many layers. However, FIG. 7C only shows the top layer.

FIG. 7C depicts a plurality of circles that represent the memory holes, which are also referred to as vertical columns. Each of the memory holes/vertical columns include multiple select transistors (also referred to as a select gate or selection gate) and multiple memory cells. In one embodiment, each memory hole/vertical column implements a NAND string. For example, FIG. 7C labels a subset of the memory holes/vertical columns/NAND strings 716, 718, 720. 722, 724, 726, 728, 730 and 732.

FIG. 7C also depicts a set of bit lines 734, including bit lines 736, 738, 740, 742, . . . 744. FIG. 7C shows twenty four bit lines because only a portion of the block is depicted. It is contemplated that more than twenty four bit lines connected to memory holes/vertical columns of the block. Each of the circles representing memory holes/vertical columns has an "x" to indicate its connection to one bit line. For example, bit line 736 is connected to memory holes/vertical columns 718, 720, 722, 726 and 732.

The block depicted in FIG. 7C includes a set of isolation regions 746, 748, 750 and 752, which are formed of SiO$_2$. However, other dielectric materials also can be used. Isolation regions 746, 748, 750 and 752 serve to divide the top layers of the block into five regions For example, the top layer depicted in FIG. 7C is divided into regions 754, 756, 758, 760 and 762.

In one embodiment, the isolation regions only divide the layers used to implement select gates so that NAND strings in different regions can be independently selected. In one example implementation, a bit line connects to one memory hole/vertical column/NAND string in each of regions 754,

756, 758, 760 and 762. In that implementation, each block has twenty four rows of active columns and each bit line connects to five rows in each block.

In one embodiment, all five memory holes/vertical columns/NAND strings connected to a common bit line are connected to the same set of word lines. Therefore, the system uses the drain side selection lines to choose one (or another subset) of the five to be subjected to a memory operation (program, verify, read, and/or erase).

FIG. 7C also shows Line Interconnects LI, which are metal connections to the source line SL from above the memory array. Line Interconnects LI are positioned adjacent regions 754 and 762.

Although FIG. 7C shows each region 754, 756, 758, 760 and 762 having four rows of memory holes/vertical columns, five regions and twenty four rows of memory holes/vertical columns in a block, those exact numbers are an example implementation. Other embodiments may include more or less regions per block, more or less rows of memory holes/vertical columns per region and more or less rows of vertical columns per block.

FIG. 7C also shows the memory holes/vertical columns being staggered. In other embodiments, different patterns of staggering can be used. In some embodiments, the memory holes/vertical columns are not staggered.

Figure 7D:
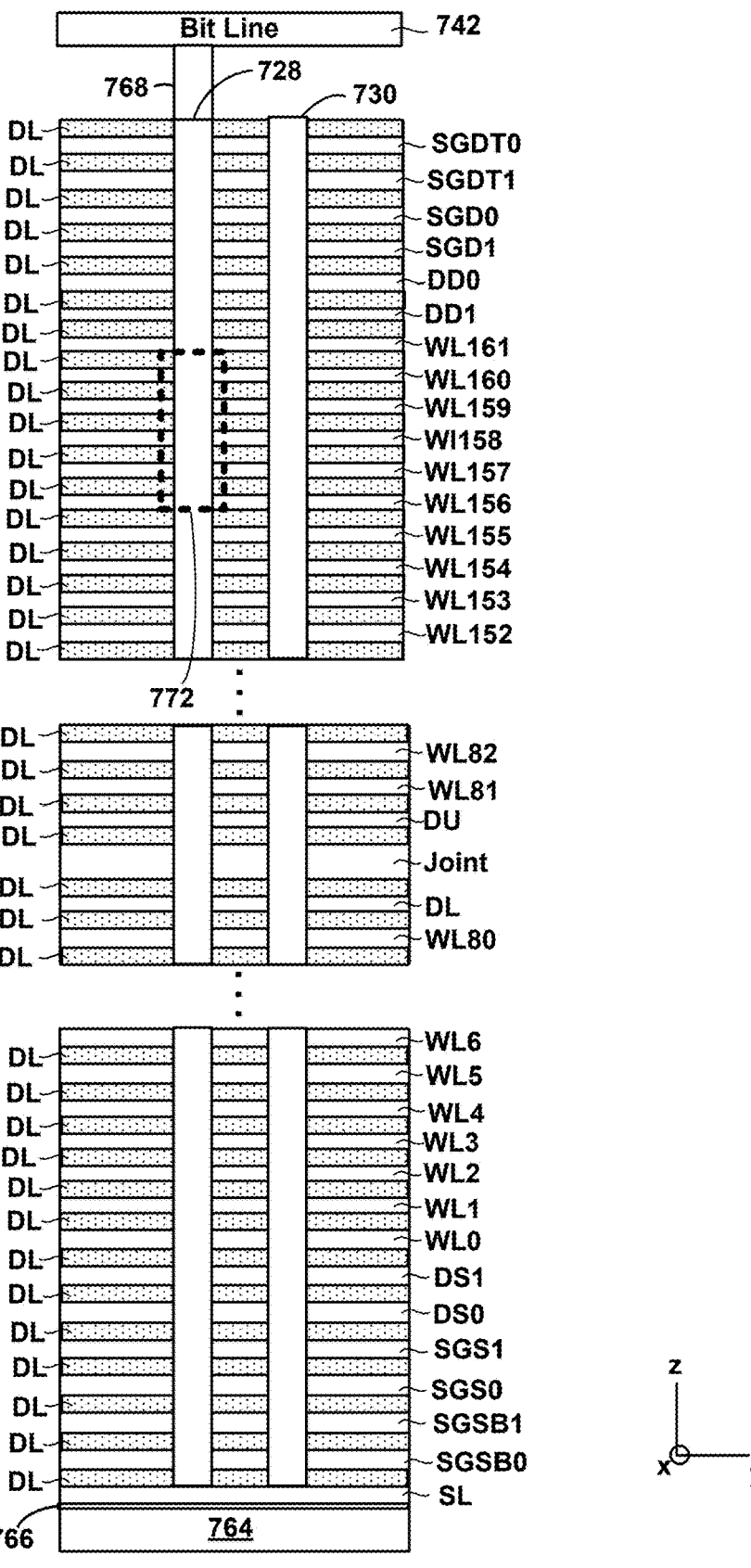
FIG. 7D depicts a cross sectional view of a portion of one embodiment of a block of memory cells.

FIG. 7D depicts a portion of one embodiment of a three dimensional memory structure 502 showing a cross-sectional view along line AA of FIG. 7C. This cross sectional view cuts through memory holes/vertical columns (NAND strings) 728 and 730 of region 762 (see FIG. 7C).

The structure of FIG. 7D includes two drain side select layers SGD0 and SGD1, the source side select layers SGS0 and SGS1, two drain side GIDL generation transistor layers SGDT0 and SGDT1, two source side GIDL generation transistor layers SGSB0 and SGSB1, two drain side dummy word line layers DD0 and DD1, two source side dummy word line layers DS0 and DS1, dummy word line layers DU and DL, one hundred and sixty two word line layers WL0-WL161 for connecting to data memory cells, and dielectric layers DL.

Other embodiments can implement more or less than the numbers described above for FIG. 7D. In one embodiment, SGD0 and SGD1 are connected together and SGS0 and SGS1 are connected together. In other embodiments, more or less number of SGDs (greater or lesser than two) are connected together, and more or less number of SGS devices (greater or lesser than two) connected together.

In one embodiment, erasing the memory cells is performed using gate induced drain leakage ("GIDL"), which includes generating charge carriers at the GIDL generation transistors such that the carriers get injected into the charge trapping layers of the NAND strings to change threshold voltage of the memory cells. FIG. 7D shows two GIDL generation transistors at each end of the NAND string. However, in other embodiments there are more or less than three.

Embodiments that use GIDL at both sides of the NAND string may have GIDL generation transistors at both sides. Embodiments that use GIDL at only the drain side of the NAND string may have GIDL generation transistors only at the drain side. Embodiments that use GIDL at only the source side of the NAND string may have GIDL generation transistors only at the source side.

FIG. 7D shows two GIDL generation transistors at each end of the NAND string. It is likely that charge carriers are only generated by GIDL at one of the two GIDL generation transistors at each end of the NAND string. Based on process variances during manufacturing, it is likely that one of the two GIDL generation transistors at an end of the NAND string is best suited for GIDL.

For example, the GIDL generation transistors have an abrupt PN junction to generate the charge carriers for GIDL and, during fabrication, a phosphorous diffusion is performed at the polysilicon channel of the GIDL generation transistors. In some cases, the GIDL generation transistor with the shallowest phosphorous diffusion is the GIDL generation transistor that generates the charge carriers during erase. However, in some embodiments charge carriers can be generated by GIDL at multiple GIDL generation transistors at a particular side of the NAND string.

Memory holes/Vertical columns 728 and 730 are depicted protruding through the drain side select layers, source side select layers, dummy word line layers, GIDL generation transistor layers and word line layers. In one embodiment, each memory hole/vertical column comprises a vertical NAND string. Below the memory holes/vertical columns and the layers listed below is substrate 764, an insulating film 766 on the substrate, and source line SL. The NAND string of memory hole/vertical column 728 has a source end at a bottom of the stack and a drain end at a top of the stack. As in agreement with FIG. 7C, FIG. 7D show vertical memory hole/column 728 connected to bit line 742 via connector 768.

For ease of reference, drain side select layers, source side select layers, dummy word line layers, GIDL generation transistor layers and data word line layers collectively are referred to as conductive layers.

In one embodiment, the conductive layers are made from a combination of TiN and Tungsten. In other embodiments, other materials can be used to form the conductive layers, such as doped polysilicon, metal such as Tungsten, metal silicide, such as nickel silicide, tungsten silicide, aluminum silicide or the combination thereof.

In some embodiments, different conductive layers can be formed from different materials. Between conductive layers are dielectric layers DL. In one embodiment, the dielectric layers are made from $SiO_2$. In other embodiments, other dielectric materials can be used to form the dielectric layers.

The non-volatile memory cells are formed along memory holes/vertical columns which extend through alternating conductive and dielectric layers in the stack. In one embodiment, the memory cells are arranged in NAND strings. The word line layers WL0-WL161 connect to memory cells (also called data memory cells). Dummy word line layers connect to dummy memory cells.

A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD0 and SGD1 are used to electrically connect and disconnect NAND strings from bit lines. Source side select layers SGS0 and SGS1 are used to electrically connect and disconnect NAND strings from the source line SL.

FIG. 7D shows that the memory array is implemented as a two tier architecture, with the tiers separated by a Joint area. In one embodiment it is expensive and/or challenging to etch so many word line layers intermixed with dielectric layers. To ease this burden, one embodiment includes laying down a first stack of word line layers (e.g., WL0-WL80) alternating with dielectric layers, laying down the Joint area, and laying down a second stack of word line layers (e.g., WL81-WL161) alternating with dielectric layers. The Joint area are positioned between the first stack and the second stack. In one embodiment, the Joint areas are made from the same materials as the word line layers. In other embodiments, there can no Joint area or there can be multiple Joint areas.

Figure 7E:
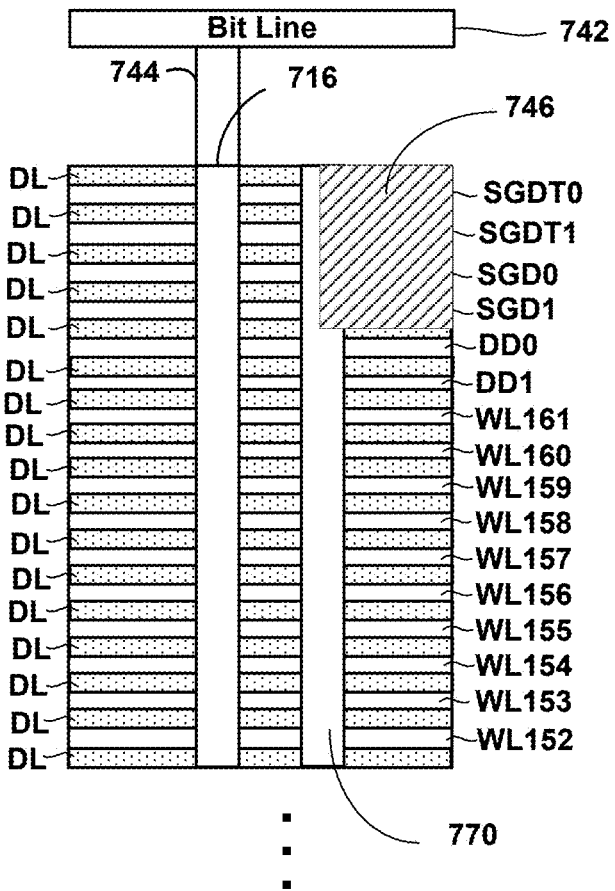
FIG. 7E depicts a cross sectional view of a portion of one embodiment of a block of memory cells.

FIG. 7E depicts a portion of one embodiment of a three dimensional memory structure 502 showing a cross-sectional view along line BB of FIG. 7C. This cross sectional view cuts through memory holes/vertical columns (NAND strings) 716 and 770 of region 754 (see FIG. 7C). FIG. 7E shows the same alternating conductive and dielectric layers as FIG. 7D.

FIG. 7E also shows isolation region 746. Isolation regions 746, 748, 750 and 752 occupy space that would have been used for a portion of the memory holes/vertical columns/ NAND stings. For example, isolation region 746 occupies space that would have been used for a portion of memory hole/vertical column 770. More specifically, a portion (e.g., half the diameter) of vertical column 770 has been removed in layers SGDT0, SGDT1, SGD0, and SGD1 to accommodate isolation region 746.

Thus, while most of the vertical column 770 is cylindrical (with a circular cross section), the portion of vertical column 770 in layers SGDT0, SGDT1, SGD0, and SGD1 has a semi-circular cross section. In one embodiment, after the stack of alternating conductive and dielectric layers is formed, the stack is etched to create space for the isolation region and that space is then filled in with SiO₂. This structure allows for separate control of SGDT0, SGDT1, SGD0, and SGD1 for regions 754, 756, 758, 760, and 762.

Figure 7F:
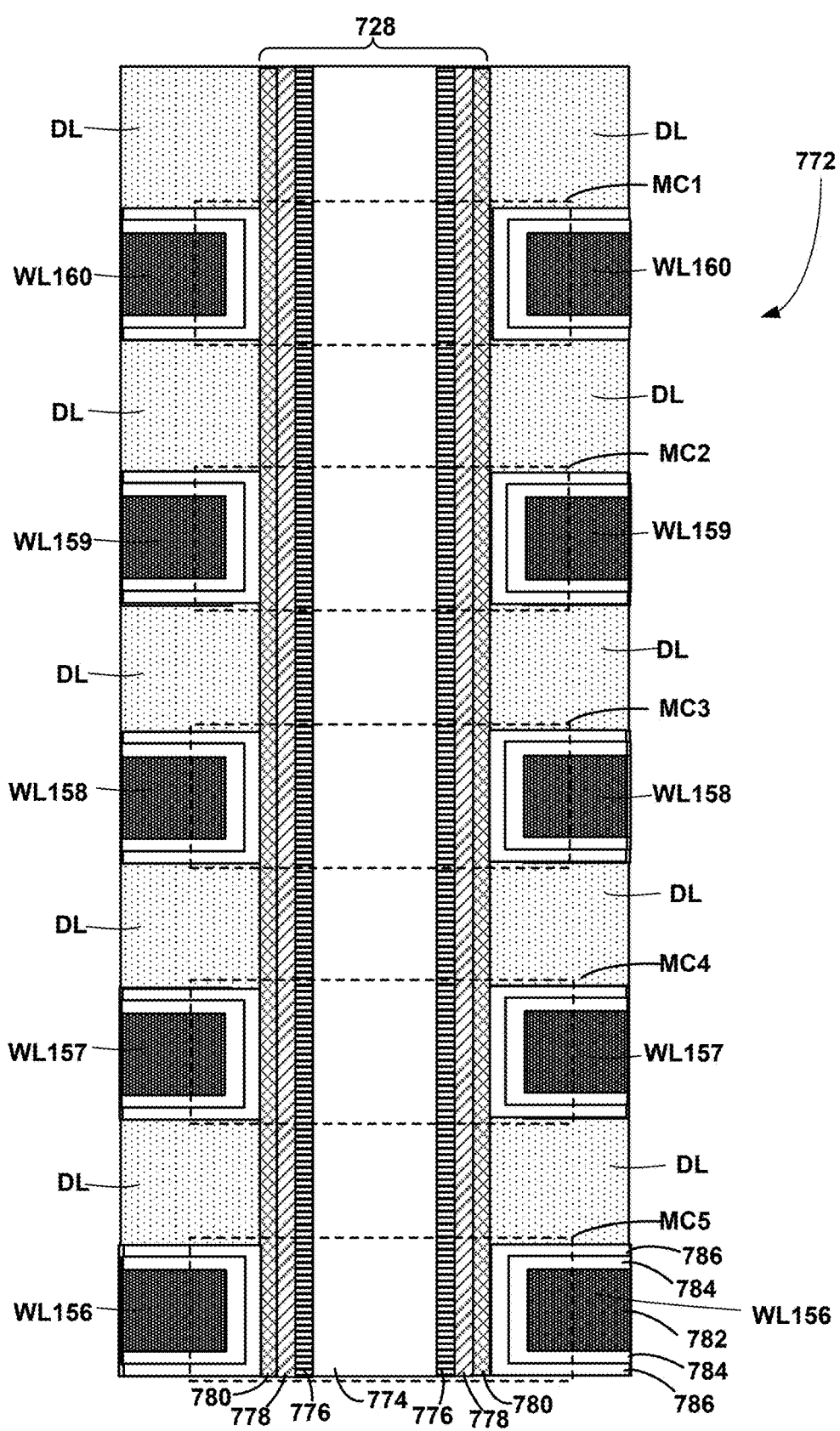
FIG. 7F is a cross sectional view of one embodiment of a vertical column of memory cells.

FIG. 7F depicts a cross sectional view of region 772 of FIG. 7D that includes a portion of memory hole/vertical column 728. In one embodiment, the memory holes/vertical columns are round. However, in other embodiments other shapes can be used. In one embodiment, memory hole/ vertical column 728 includes an inner core layer 774 that is made of a dielectric, such as SiO₂. Other materials also can be used.

Surrounding inner core 774 is polysilicon channel 776. Materials other than polysilicon also can be used. Note that it is the channel 776 that connects to the bit line and the source line. Surrounding channel 776 is a tunneling dielectric 778. In one embodiment, tunneling dielectric 778 has an ONO structure. Surrounding tunneling dielectric 778 is charge trapping layer 780, such as (for example) Silicon Nitride. Other memory materials and structures also can be used. The technology described herein is not limited to any particular material or structure.

FIG. 7F depicts dielectric layers DL as well as word line layers WL160, WL159, WL158, WL157, and WL156. Each of the word line layers includes a word line region 782 surrounded by an aluminum oxide layer 784, which is surrounded by a blocking oxide layer 786. In other embodiments, the blocking oxide layer can be a vertical layer parallel and adjacent to charge trapping layer 780. The physical interaction of the word line layers with the vertical column forms the memory cells.

Thus, in one embodiment a memory cell includes channel 776, tunneling dielectric 778, charge trapping layer 780, blocking oxide layer 786, aluminum oxide layer 784 and word line region 782. For example, word line layer WL 160 and a portion of memory hole/vertical column 728 comprise a memory cell MC1. Word line layer WL159 and a portion of memory hole/vertical column 728 comprise a memory cell MC2. Word line layer WL158 and a portion of memory hole/vertical column 728 comprise a memory cell MC3. Word line layer WL157 and a portion of memory hole/ vertical column 728 comprise a memory cell MC4. Word line layer WL156 and a portion of memory hole/vertical column 728 comprise a memory cell MC5. In other architectures, a memory cell may have a different structure. However, the memory cell would still be the storage unit.

When a memory cell is programmed, electrons are stored in a portion of the charge trapping layer 780 which is associated with (e.g., in) the memory cell. These electrons are drawn into the charge trapping layer 780 from the channel 776, through the tunneling dielectric 778, in response to an appropriate voltage on word line region 782. The threshold voltage ("Vth") of a memory cell is increased in proportion to the amount of stored charge.

In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as GIDL.

Figure 7G:
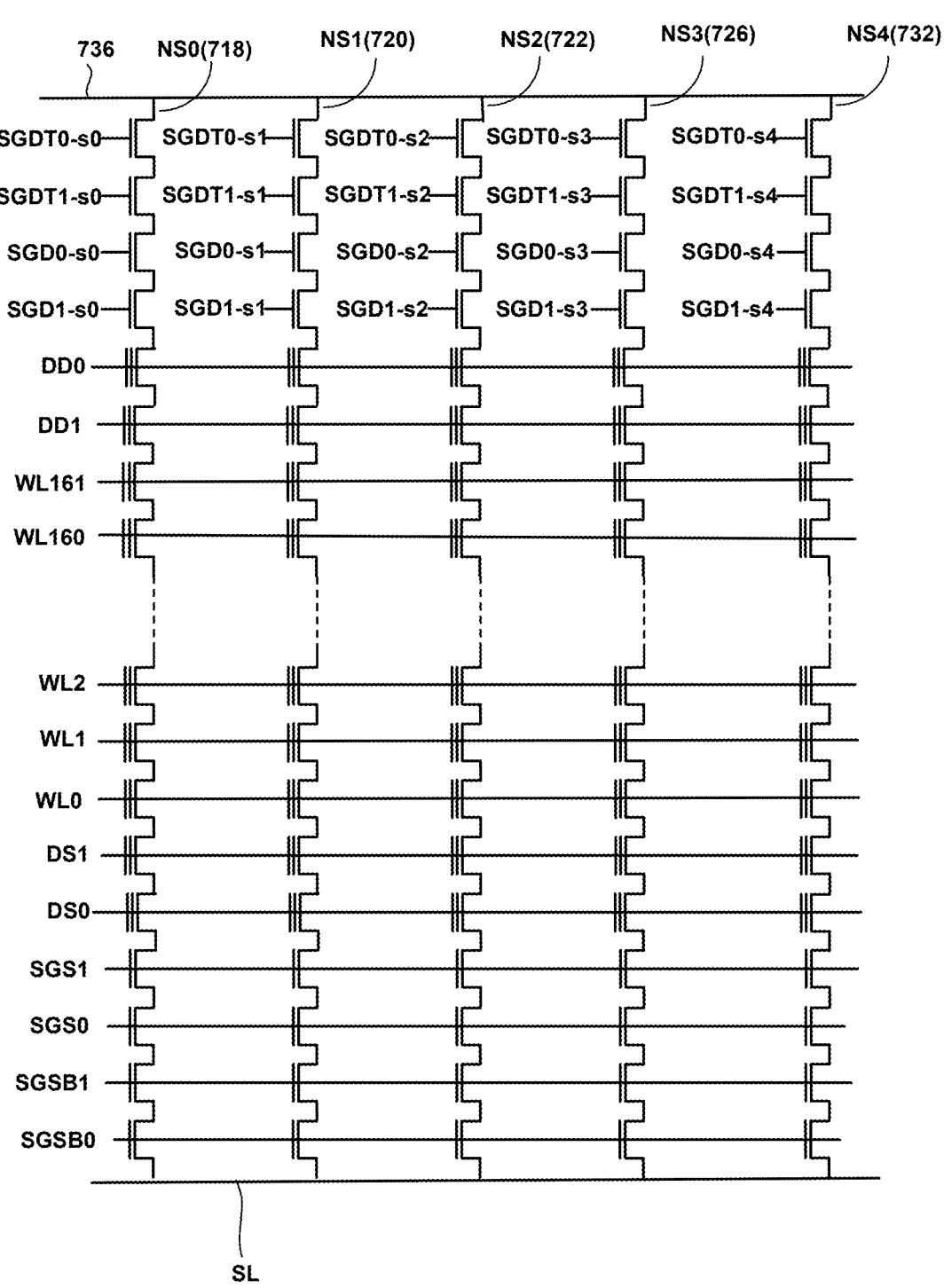
FIG. 7G is a schematic of a plurality of NAND strings in multiple regions of a same block.

FIG. 7G is a schematic diagram of a portion of the three dimensional memory structure 502 depicted in in FIGS. 7B-7F. FIG. 7G shows physical data word lines WL0-WL161 running across the entire block. The structure of FIG. 7G corresponds to a portion 712 in Block 2 of FIG. 7B, including bit line 736. In an embodiment, within the block each bit line is connected to five NAND strings, one in each region of regions 754, 756, 758, 760, 762.

Thus, FIG. 7G shows bit line 736 connected to NAND string NS0 (which corresponds to memory hole/vertical column 718 of region 754), NAND string NS1 (which corresponds to memory hole/vertical column 720 of region 756), NAND string NS2 (which corresponds to vertical column 722 of region 758), NAND string NS3 (which corresponds to memory hole/vertical column 726 of region 760), and NAND string NS4 (which corresponds to memory hole/vertical column 732 of region 762).

Drain side select line/layer SGD0 is separated by isolation regions isolation regions 746, 748, 750 and 752 to form SGD0-s0, SGD0-s1, SGD0-s2, SGD0-s3 and SGD0-s4 to separately connect to and independently control regions 754, 756, 758, 760, 762.

Similarly, drain side select line/layer SGD1 is separated by isolation regions 746, 748, 750 and 752 to form SGD1-s0, SGD1-s1, SGD1-s2, SGD1-s3 and SGD1-s4 to separately connect to and independently control regions 754, 756, 758, 760, 762.

Drain side GIDL generation transistor control line/layer SGDT0 is separated by isolation regions 746, 748, 750 and 752 to form SGDT0-s0, SGDT0-s1, SGDT0-s2, SGDT0-s3 and SGDT0-s4 to separately connect to and independently control regions 754, 756, 758, 760, 762.

Drain side GIDL generation transistor control line/layer SGDT1 is separated by isolation regions 746, 748, 750 and 752 to form SGDT1-s0, SGDT1-s1, SGDT1-s2, SGDT1-s3 and SGDT1-s4 to separately connect to and independently control regions 754, 756, 758, 760, 762.

FIG. 7G only shows NAND strings connected to bit line 736. However, a full schematic of the block would show every bit line and five vertical NAND strings (that are in separate regions) connected to each bit line.

Although the example memories of FIGS. 7B-7G are three dimensional memory structures that include vertical NAND strings with charge-trapping material, other (2D and 3D) memory structures also can be used with the technology described herein.

The memory systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate.

Figure 8A:
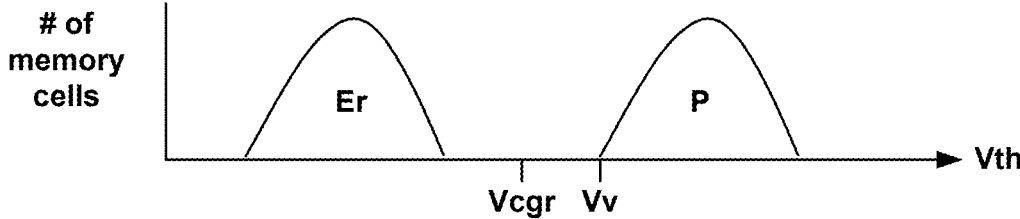
FIGS. 8A-8D are diagrams each depicting example threshold voltage distributions.

FIG. 8A is a diagram of example threshold voltage versus number of memory cells, and illustrates example threshold voltage distributions for the memory array when each memory cell stores one bit of data per memory cell. Memory cells that store one bit of data per memory cell data are referred to as single level cells ("SLC"). A block of SLC memory cells is referred to herein as an "SLC block."

FIG. 8A shows two threshold voltage distributions: Er and P. Threshold voltage distribution Er corresponds to an erased data state, and threshold voltage distribution P corresponds to a programmed data state. Memory cells that have threshold voltages in threshold voltage distribution Er are in the erased data state. Memory cells that have threshold voltages in threshold voltage distribution P are in the programmed data state.

In one embodiment, erased memory cells store data "1" and programmed memory cells store data "0." FIG. 8A depicts read reference voltage V_{CGR}. By testing (e.g., performing one or more sense operations) whether the threshold voltage of a given memory cell is above or below V_{CGR}, the system can determine whether a memory cells is erased (state Er) or programmed (state P). FIG. 8A also depicts verify reference voltage Vv. In some embodiments, when programming memory cells to data state P, the system will test whether those memory cells have a threshold voltage greater than or equal to Vv.

In general, during read operations, a selected word line is connected to read reference voltage V_{CGR}, and a conduction current of the memory cell is measured to determine whether the memory cell turned ON (conducted current) in response to the voltage applied to the word line. If the conduction current is measured to be greater than a certain value, then it is assumed that the memory cell turned ON and the threshold voltage of the memory cell is less than the voltage applied to the word line.

In contrast, if the conduction current is not measured to be greater than the certain value, then it is assumed that the memory cell did not turn ON and the threshold voltage of the memory cell is greater than the voltage applied to the word line. During a read process, unselected memory cells are provided with a read pass voltage VREAD (also referred to as a bypass voltage) at their control gates so that these memory cells will operate as pass gates (e.g., conducting current regardless of whether they are programmed or erased).

Figure 8B:
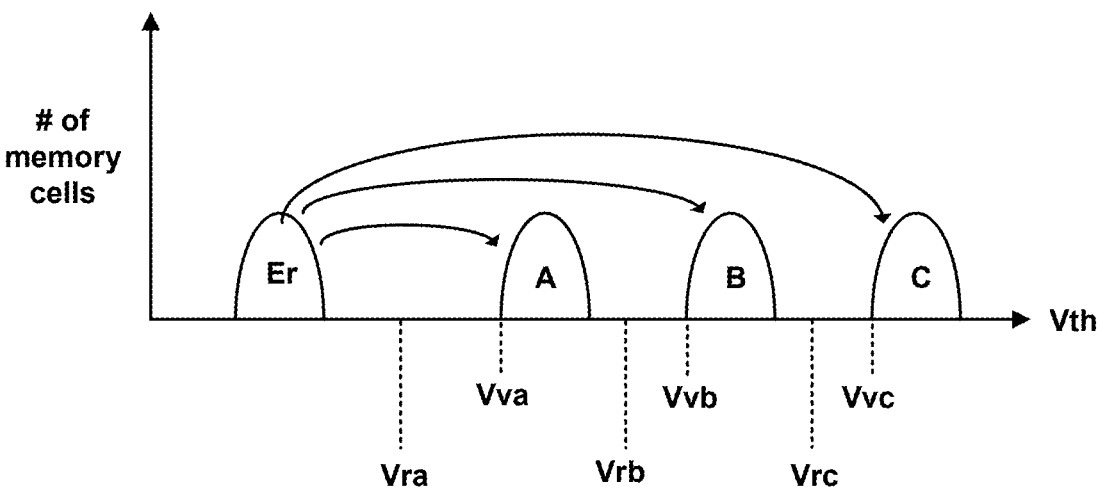
Figures 8C, 8D:
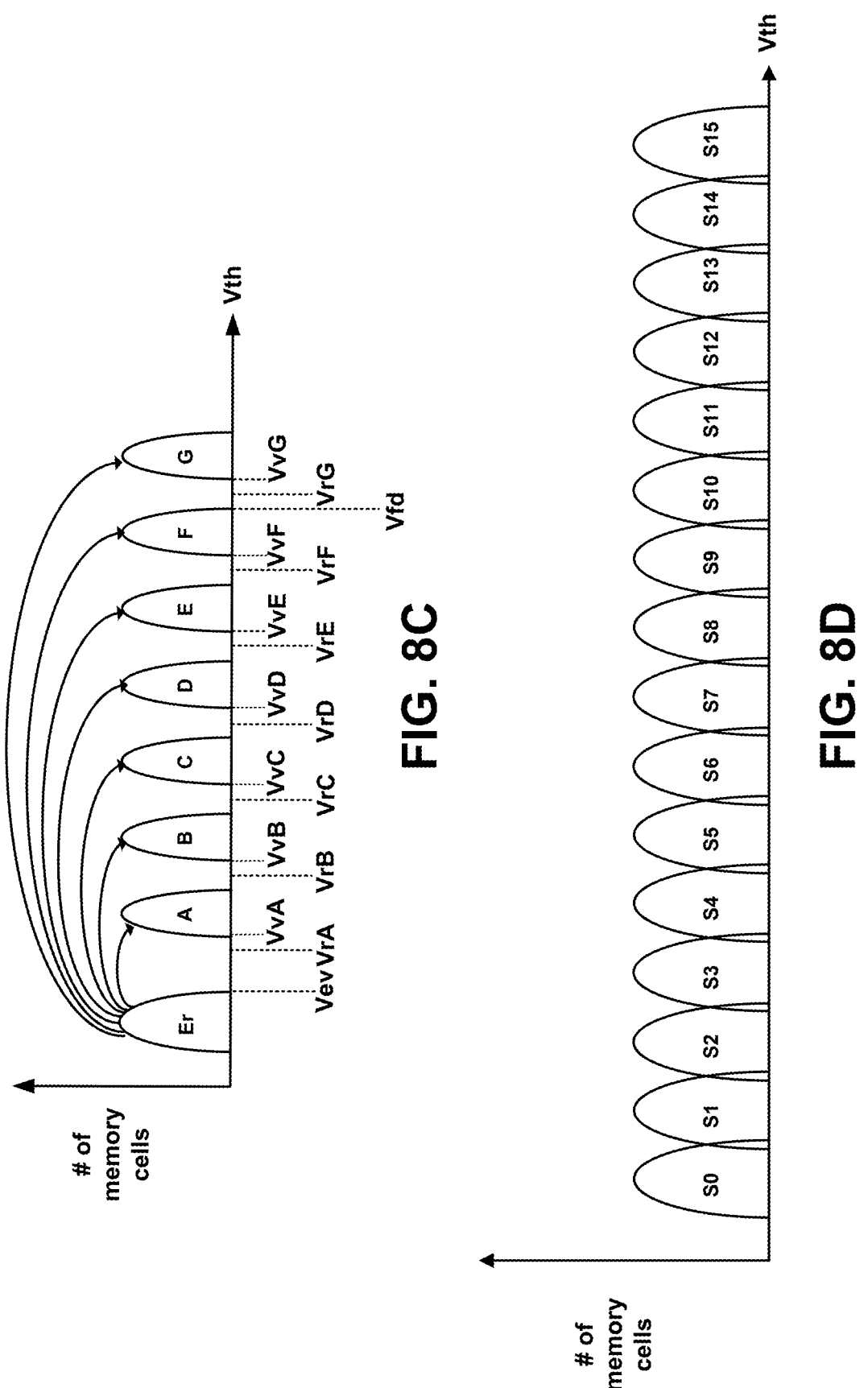

FIGS. 8B-8D illustrate example threshold voltage distributions for a memory array in which each memory cell stores multiple bit per memory cell data. Memory cells that store multiple bit per memory cell data are referred to as multi-level cells ("MLC"). The data stored in MLC memory cells are referred to as "MLC data," and a block of MLC memory cells is referred to herein as an "MLC block.". In the example embodiment of FIG. 8B, each memory cell stores two bits of data. Other embodiments may use other data capacities per memory cell (e.g., such as three, four, or five or more bits of data per memory cell).

FIG. 8B shows a first threshold voltage distribution Er for erased memory cells. Three threshold voltage distributions A, B and C for programmed memory cells also are depicted. In an embodiment, the threshold voltages in the distribution Er are negative and the threshold voltages in distributions A, B and C are positive. Each distinct threshold voltage distribution of FIG. 8B corresponds to predetermined values for the set of data bits.

In one embodiment, the two bits of data stored in a memory cell are in different logical pages, referred to as a lower page ("LP") and an upper page ("UP"). In other embodiments, all bits of data stored in a memory cell are in a common logical page. The specific relationship between the data programmed into the memory cell and the threshold voltage levels of the cell depends upon the data encoding scheme adopted for the cells. Table 1 provides an example encoding scheme.

TABLE 1

|  | Er | A | B | C |
|---|---|---|---|---|
| LP | 1 | 0 | 0 | 1 |
| UP | 1 | 1 | 0 | 0 |

In one embodiment, known as full sequence programming, memory cells can be programmed from the erased data state Er directly to any of the programmed data states A, B or C. For example, a population of memory cells to be programmed may first be erased so that all memory cells in the population are in erased data state Er. Then, a programming process is used to program memory cells directly into data states A, B, and/or C.

For example, while some memory cells are being programmed from erased data state Er to data state A, other memory cells are being programmed from erased data state Er to data state B and/or from erased data state Er to data state C. The arrows of FIG. 8B represent full sequence programming. In some embodiments, data states A-C can overlap, with memory controller 104 (or control die 540) relying on error correction to identify the correct data being stored.

FIG. 8C depicts example threshold voltage distributions for memory cells where each memory cell stores three bits of data per memory cells (which is another example of MLC data). FIG. 8C shows eight threshold voltage distributions, corresponding to eight data states. The first threshold voltage distribution (erased data state) Er represents memory cells that are erased. The other seven threshold voltage distributions (data states) A-G represent memory cells that are programmed and, therefore, also are called programmed states.

Each threshold voltage distribution (data state) corresponds to predetermined values for the set of data bits. The specific relationship between the data programmed into the memory cell and the threshold voltage levels of the cell depends upon the data encoding scheme adopted for the cells.

In one embodiment, data values are assigned to the threshold voltage ranges using a Gray code assignment so that if the threshold voltage of a memory erroneously shifts to its neighboring physical state, only one bit will be affected. Table 2 provides an example of an encoding scheme for embodiments in which each bit of data of the three bits of data stored in a memory cell are in different logical pages, referred to as an LP, a middle page ("MP") and a UP.

21

TABLE 2

|  | Er | A | B | C | D | E | F | G |
|---|---|---|---|---|---|---|---|---|
| LP | 1 | 1 | 1 | 0 | 0 | 0 | 0 | 1 |
| MP | 1 | 1 | 0 | 0 | 1 | 1 | 0 | 0 |
| UP | 1 | 0 | 0 | 0 | 0 | 1 | 1 | 1 |

FIG. 8C shows seven read reference voltages, VrA, VrB, VrC, VID, VrE, VrF, and VrG for reading data from memory cells. By testing (e.g., performing sense operations) whether the threshold voltage of a given memory cell is above or below the seven read reference voltages, the system can determine what data state (e.g., A, B, C, D, . . . ) a memory cell is in.

FIG. 8C also shows seven verify reference voltages, VvA, VvB, VvC, VvD, VvE, VvF, and VvG. In some embodiments, when programming memory cells to data states A, B, C, D, E, F and G, the system will test whether those memory cells have a threshold voltage greater than or equal to VvA, VvB, VvC, VvD, VvE, VvF and VvG, respectively. FIG. 8C also shows Vev, which is an erase verify reference voltage to test whether a memory cell has been properly erased.

In an embodiment that utilizes full sequence programming, memory cells can be programmed from the erased data state Er directly to any of the programmed data states A-G. For example, a population of memory cells to be programmed may first be erased so that all memory cells in the population are in erased data state Er. Then, a programming process is used to program memory cells directly into data states A, B, C, D, E, F, and/or G.

For example, while some memory cells are being programmed from erased data state Er to data state A, other memory cells are being programmed from erased data state Er to data state B and/or from erased data state Er to data state C, and so on. The arrows of FIG. 8C represent the full sequence programming. In some embodiments, data states A-G can overlap, with memory controller 104 and/or control die 540 relying on error correction to identify the correct data being stored. In some embodiments, rather than using full sequence programming, the system can use multi-pass programming processes known in the art.

In general, during verify operations and read operations, the selected word line is connected to a voltage (one example of a reference signal), a level of which is specified for each read operation (e.g., see read compare voltages/levels VrA, VrB, VrC, VrD, VrE, VrF, and VrG, of FIG. 8C) or verify operation (e.g. see verify target voltages/levels VvA, VvB, VvC, VvD, VVE, VvF, and VvG of FIG. 8C) to determine whether a threshold voltage of the concerned memory cell has reached such level.

After applying the word line voltage, the conduction current of the memory cell is measured to determine whether the memory cell turned ON (conducted current) in response to the voltage applied to the word line. If the conduction current is measured to be greater than a certain value, then it is assumed that the memory cell turned ON and the voltage applied to the word line is greater than the threshold voltage of the memory cell.

If the conduction current is not measured to be greater than the certain value, then it is assumed that the memory cell did not turn ON and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in a sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. The technology described herein can be used with different methods known in the art for verifying/reading. Other read and verify techniques known in the art also can be used.

FIG. 8D depicts threshold voltage distributions when each memory cell stores four bits of data, which is another example of MLC data. FIG. 8D depicts that there may be some overlap between the threshold voltage distributions (data states) S0-S15. The overlap may occur due to factors such as memory cells losing charge (and hence dropping in threshold voltage).

Program disturb can unintentionally increase the threshold voltage of a memory cell. Likewise, read disturb can unintentionally increase the threshold voltage of a memory cell. Over time, the locations of the threshold voltage distributions may change. Such changes can increase the bit error rate, thereby increasing decoding time or even making decoding impossible. Changing the read reference voltages can help to mitigate such effects. Using ECC during the read process can fix errors and ambiguities.

In some embodiments, the threshold voltage distributions for a population of memory cells storing four bits of data per memory cell do not overlap and are separated from each other. The threshold voltage distributions of FIG. 8D will include read reference voltages and verify reference voltages, as discussed above.

When using four bits per memory cell, the memory can be programmed using the full sequence programming discussed above, or multi-pass programming processes known in the art. Each threshold voltage distribution (data state) of FIG. 8D corresponds to predetermined values for the set of data bits.

The specific relationship between the data programmed into the memory cell and the threshold voltage levels of the cell depends upon the data encoding scheme adopted for the cells. Table 3 provides an example of an encoding scheme for embodiments in which each bit of data of the four bits of data stored in a memory cell are in different logical pages, referred to as an LP, an MP, a UP and top page (TP).

TABLE 3

|  | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|
| TP | 1 | 1 | 1 | 1 | 1 | 0 | 0 | 0 | 0 | 0 | 1 | 1 | 0 | 0 | 0 | 1 |
| UP | 1 | 1 | 0 | 0 | 0 | 0 | 0 | 0 | 1 | 1 | 1 | 1 | 1 | 1 | 0 | 0 |

TABLE 3-continued

|     | S0 | S1 | S2 | S3 | S4 | S5 | S6 | S7 | S8 | S9 | S10 | S11 | S12 | S13 | S14 | S15 |
|-----|----|----|----|----|----|----|----|----|----|----|-----|-----|-----|-----|-----|-----|
| MP  | 1  | 1  | 1  | 0  | 0  | 0  | 0  | 1  | 1  | 0  | 0   | 0   | 0   | 1   | 1   | 1   |
| LP  | 1  | 0  | 0  | 0  | 1  | 1  | 0  | 0  | 0  | 0  | 0   | 1   | 1   | 1   | 1   | 1   |

Figure 9:
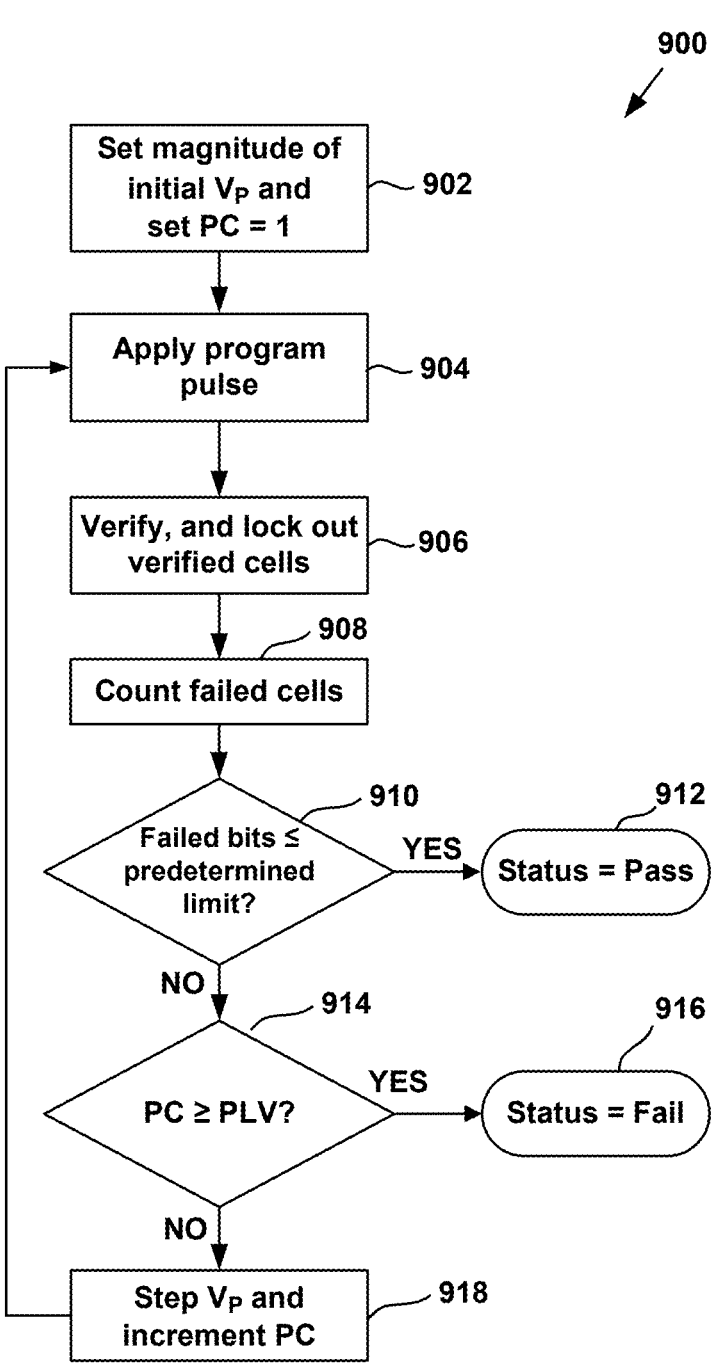
FIG. 9 is a flowchart describing an embodiment of a process for programming non-volatile memory.

FIG. 9 is a flowchart describing an embodiment of a process 900 for programming a memory cell. In an example embodiment, process 900 is performed on memory die 500 (FIG. 5A), memory die 538 (FIG. 5B) or memory die 606 (FIGS. 6A-6B) using the control circuits discussed above. For example, process 900 can be performed at the direction of state machine 528 (FIGS. 5A-5B). Process 900 also can be used to implement the full sequence programming discussed above. Additionally, process 900 can be used to implement each phase of a multi-phase programming process.

In step 902, a programming voltage ("V$_P$") is initialized to a starting program voltage V$_{Pinit}$ (e.g., between about 12V to about 16V, or some other value) and a program counter PC maintained by state machine 228 is initialized at 1.

In step 904, a program pulse having a magnitude V$_P$ is applied to the selected word line (the word line selected for programming). In an embodiment, the group of memory cells being concurrently programmed are all connected to the same word line (the selected word line). If a memory cell is to be programmed, then the corresponding bit line coupled to the memory cell is grounded.

If a memory cell should remain at its current threshold voltage, then the corresponding bit line coupled to the memory cell is connected to Vdd to inhibit programming. In an embodiment, the unselected word lines receive one or more boosting voltages (e.g., between about 7V to about 11V, or some other value) to perform boosting schemes known in the art.

In step 904, the program pulse is applied to all memory cells connected to the selected word line so that all of the connected memory cells are programmed concurrently. That is, they are programmed at the same time or during overlapping times (both of which are considered concurrent). In this manner all of the memory cells connected to the selected word line will concurrently have their threshold voltage change, unless they have been locked out from programming.

In step 906, the memory cells are verified using the appropriate set of verify reference voltages to perform one or more verify operations. In an embodiment, the verification process is performed by testing whether the threshold voltages of the memory cells selected for programming have reached the appropriate verify reference voltage.

In step 908, the memory system counts the number of memory cells that have not yet reached their respective target threshold voltage distribution. That is, the system counts the number of memory cells that have so far failed the verify process. This counting can be done by controller 104 (FIG. 1), state machine 528 (FIGS. 5A-5B), control die 540 (FIG. 5B), or other logic. In the remaining discussion, the term "Controller Device" may be one or more of controller 104 (FIG. 1), state machine 528 (FIGS. 5A-5B), control die 540 (FIG. 5B) or other similar controller device.

In an embodiment, each of sense amps 518 (FIG. 5A) stores the status (pass/fail) of their respective memory cells. In an embodiment, one total count reflects the total number of memory cells currently being programmed that have failed the last verify step. In another embodiment, separate counts are kept for each data state.

In step 910, a determination is made whether the count from step 908 is less than or equal to a predetermined limit. In an embodiment, the predetermined limit is the number of bits that can be corrected by ECC during a read process for the page of memory cells.

If the number of failed cells is less than or equal to the predetermined limit, than the programming process can stop and a status of "PASS" is reported in step 912. In this situation, enough memory cells programmed correctly such that the few remaining memory cells that have not been completely programmed can be corrected using ECC during the read process.

In some embodiments, the predetermined limit used in step 910 is below the number of bits that can be corrected by ECC during a read process to allow for future/additional errors. When programming less than all of the memory cells for a page, or comparing a count for only one data state (or less than all states), then the predetermined limit can be a portion (pro-rata or not pro-rata) of the number of bits that can be corrected by ECC during a read process for the page of memory cells. In some embodiments, the limit is not predetermined. Instead, the limit changes based on the number of errors already counted for the page, the number of program-erase cycles performed or other criteria.

If the number of failed memory cells is not less than the predetermined limit, then the programming process continues at step 914 and the program counter PC is checked against a program limit value ("PLV"). Examples of program limit values include 6, 12, 16, 20 and 30, although other values can be used. If the program counter PC is greater than or equal to program limit value PLV, then the program process is considered to have failed and a status of FAIL is reported in step 916.

If the program counter PC is not greater than or equal to program limit value PLV, then the process continues at step 918 in which the Program Counter PC is incremented by 1 and program voltage V$_P$ is stepped up to the next magnitude. For example, the next program pulse will have a magnitude greater than the previous pulse by a program step size $\Delta V_P$ (e.g., a step size of between about 0.1V to about 1.0V, or some other value). The process loops back to step 904 and another program pulse is applied to the selected word line so that another iteration (steps 904-918) of programming process 900 is performed. Each pass through steps 904-918 is referred to herein as a "program loop."

In general, during verify operations and read operations, the selected word line is connected to a voltage (one example of a reference signal), a level of which is specified for each read operation (e.g., read compare levels VrA, VrB, VrC, VrD, VrE, VrF, and VrG, of FIG. 8C) or verify operation (e.g. verify target levels VvA, VvB, VvC, VvD, VvE, VvF, and VvG of FIG. 8C) to determine whether a threshold voltage of the selected memory cell has reached such level.

In an embodiment, after an appropriate read or verify voltage is applied to a selected word line, a conduction current of the memory cell is measured to determine whether the memory cell turned ON (conducts current) in response to the voltage applied to the word line. If the conduction current is measured to be greater than a certain value, then it is assumed that the memory cell turned ON and the voltage applied to the word line is greater than the threshold voltage of the memory cell.

If the conduction current is measured to be not greater than the certain value, then the memory cell did not turn ON, and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate at which the memory cell discharges or charges a dedicated capacitor in a sense amplifier. In another example, the conduction current of the selected memory cell allows (or fails to allow) the NAND string that includes the memory cell to discharge a corresponding bit line. The voltage on the bit line is measured after a period of time to see whether or not the bit line has been discharged. Note that the technology described herein can be used with different methods known in the art for verifying/reading. Other read and verify techniques known in the art also can be used.

As described above, at step 904 a program pulse is applied to the selected word line, and at step 906 memory cells coupled to the selected word line are verified using an appropriate set of verify reference voltages to perform one or more verify operations. Steps 904 and 906 are part of an iterative loop in which program pulses are applied as a series of program pulses that step up in magnitude, with intervening verify reference pulses between consecutive program pulses. Such an iterative loop is referred to herein as a "program-verify iteration."

Figure 10:
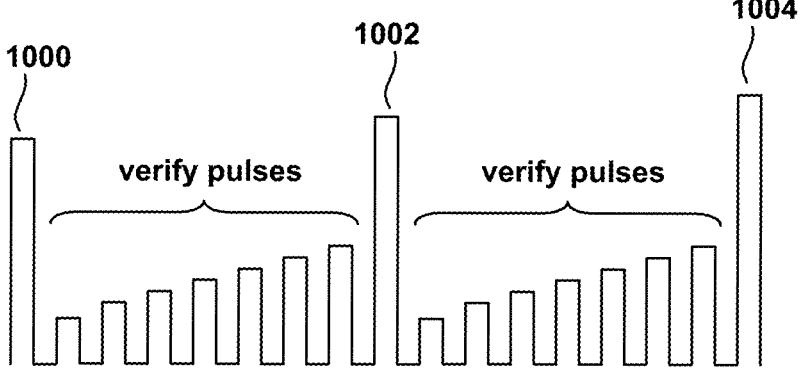
FIG. 10 depicts a word line voltage during programming and verify operations.

FIG. 10 illustrates an example of such program-verify pulses applied to a selected word line. In particular, FIG. 10 depicts program pulses 1000, 1002 and 1004 applied to the selected word line during three successive iterations of step 904 of FIG. 9. Between program pulses 1000, 1002 and 1004 verify pulses are applied to the selected word line during three successive program-verify iterations of steps 904-906 of FIG. 9 to determine whether threshold voltages of the memory cells are greater than the respective verify reference voltages.

As described above, in some embodiments a page is a unit of programming and reading and includes data stored in all memory cells connected to a common word line. For example, a page of data may be 32 KB or some other page size. Although such a large page size can increase efficiencies and storage densities when accessing larger quantities of data, hosts may want to frequently write and read smaller amounts of data (e.g., 4 KB) to and from a memory device.

When a host makes frequent memory accesses to and from these smaller amounts of data, having to access only at the page level may hurt performance. To account for this, in embodiments a memory system allows partial page reading and writing. As used herein, partial page writing also is referred to as partial page programming. In some embodiments, partial pages can be read and programmed in 4 KB increments. Other subsets of a page (e.g., 8 KB) also can be used for partial page reading and programming.

A host write command or series of host write commands that specify sequential logical addresses greater than a threshold amount (e.g., 4 KB) is referred to herein as a "sequential write command." In contrast, a host write command that corresponds to a single logical address or multiple non-sequential logical addresses is referred to herein as a "random write command."

A set of multiple host write commands is referred to herein as a host write "workload," and may include sequential write commands, random write commands, or a combination of sequential write commands and random write commands. As used herein, a host write workload has an associated "range," meaning the logical address space spanned by the set of host write commands. For example, a host write workload may include a set of write commands that span 500 KB, 200 MB, 1 GB, 16 GB, 32 GB, or some other range.

As used herein, a host write workload may be characterized as a "short range workload" and a "long range workload." These two terms do not typically have specific values, but instead may be used to compare relative workload ranges. For example, a host workload that spans logical address space of 1 GB or less may be characterized as a short range workload, whereas a host workload that spans logical address space of 32 GB or more may be characterized as a long range workload.

As described above, IOPS may be used to measure overall performance of a memory system. The most common performance characteristics measured are sequential and random operations. Sequential IOPS access locations on a storage device in a contiguous manner and are generally associated with large data transfer sizes (e.g., 128 KB). Random IOPS access locations on a storage device in a non-contiguous manner and are generally associated with small data transfer sizes, e.g., a page or partial page of data (e.g., 4 KB).

Figure 11:
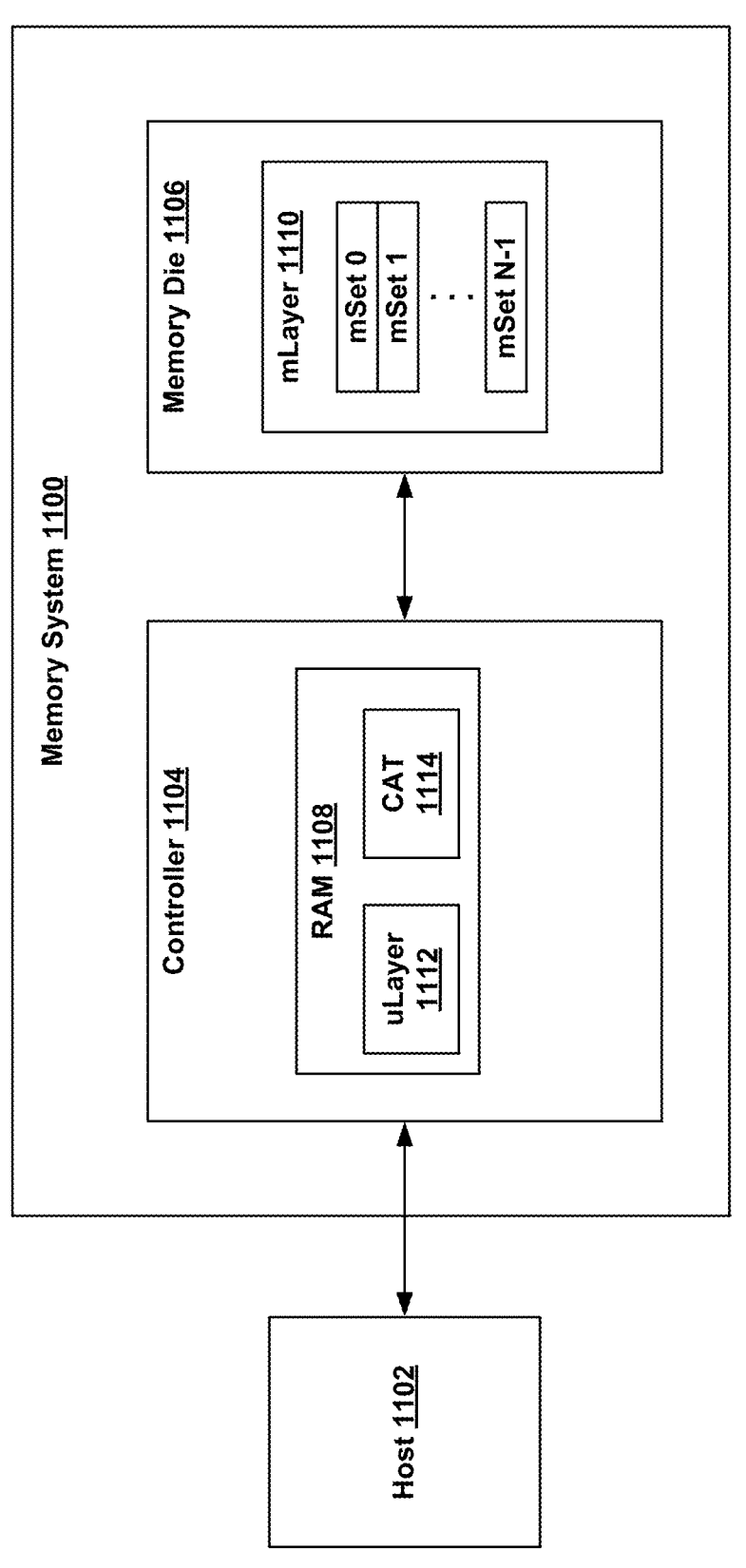
FIG. 11 is a simplified diagram of a memory system connected to a host.

FIG. 11 is a simplified diagram of a NAND-based memory system 1100 coupled to a host 1102. In embodiments, NAND-based memory system 1100 may be a SSD, a flash drive, a memory card, or other similar memory system. In an embodiment, NAND-based memory system 1100 includes a controller 1104 and one or more memory die 1106. In embodiments, host 1102 communicates read and write commands to controller 1104 for reading data from and writing data to memory die 1106. In embodiments, controller 1104 includes RAM 1108.

In an embodiment, controller 1104 is configured to perform L2P mapping between logical addresses used by host 1102 and physical addresses used by memory die 1106. In embodiments, memory system 1100 includes a mapping architecture to implement the L2P mapping. In embodiments, the mapping architecture includes a management layer ("mLayer") 1110 stored in memory die 1106, and an update layer ("uLayer") 1112 and a cache address table ("CAT") 1114 stored in RAM 1108.

In embodiments, mLayer 1110 may be an array of physical addresses of memory die 1106 indexed by corresponding LBAs, and includes an entry for every memory address in the memory space of memory die 1106. In embodiments, mLayer 1110 is divided into multiple segments referred to herein as mSets. In embodiments, each mSet constitutes a 32 KB segment of mLayer 1110, although other segment sizes also may be used. In embodiments, controller 1104 may load portions of mLayer 1110 into RAM 1108 for L2P translation purposes.

In an embodiment, when host 1102 sends a write command to memory system 1100, controller 1104 determines which physical blocks of memory die 1106 to write to, writes the corresponding data to memory die 1106, and then stores L2P mapping data in uLayer 1112. In embodiments, uLayer 1112 accumulates these update entries, and once uLayer 1112 reaches a predetermined threshold, controller 1104 triggers a "consolidation" or "eviction" from uLayer 1112.

In embodiments, this consolidation means aggregating the L2P entries into the corresponding mSet of mLayer 1110. Thus, in embodiments uLayer 1112 is a log of latest updates which have not yet been written to mSets in mLayer 1110. The purpose of uLayer 1112 is to aggregate multiple updates for the same mSets during consolidation.

Consolidation of uLayer 1112 is a CPU-intensive process. For example, assume that uLayer 1112 supports 30,000 entries, and consolidation starts at around 24,000 entries. If 8 mSets are selected, controller 1104 must parse through all 24,000 entries to determine if any of the entries belong to any of the 8 mSets, and then program them. So this whole process is very CPU-intensive.

If controller 1104 only uses uLayer 1112, the performance of random writes is significantly slower. Indeed, for each 4 KB random write, an L2P update must be performed, along with the associated CPU overhead. To avoid this, controller 1104 also includes CAT 1114 to maintain certain mSets in RAM. By so doing, controller 1104 can directly put L2P entries into the designated mSet stored in CAT 1114.

In embodiments, CAT 1114 is an organized, linear type of memory, and thus updates to CAT 1114 are relatively fast compared to updates to uLayer 1112. For example, an update to uLayer 1112 may be on the order of about 400 ns, whereas an update to CAT 1114 may be about 150 ns. So CAT 1114 helps to avoid having to do a delta update every time with uLayer 1112. The "cost" of this simplification is the amount of RAM allocated to CAT 1114.

In many memory systems, L2P updates for short range random write workloads may be implemented by updating CAT 1114. But because the size of CAT 1114 is limited, L2P updates for long range random write workloads are primarily implemented in uLayer 1112. As described above, however, an update to uLayer 1112 requires about three times more CPU time than an update to CAT 1114, and thus contributes to a significant drop in IOPS for long range random write workloads.

In addition, for long range random write workloads, the update density per mSet for uLayer 1112 typically is very low. For example, if the host workload range is 32 GB, and each mSet corresponds to 32 MB, there are 1024 mSets receiving L2P updates. In other words, host 1102 is writing into 1024 mSets in a random way.

Continuing this example, assume that uLayer 1112 has 30,000 entries and has a consolidation threshold of 24,000 entries, and 8 mSets are selected for consolidation. If the 24,000 entries from uLayer 1112 are evenly distributed over all 1024 mSets that cover the 32 GB range, there are only 24,000/1024~24 updates per mSet. Because 8 mSets are selected for consolidation, then less than 200 entries (8 mSets×24 updates/mSet=192) are freed up from uLayer 1112 during consolidation. Thus, almost 23,800 entries remain in uLayer 1112 after consolidation.

While consolidation is occurring, host 1102 typically continues to provide write commands to memory system 1100, and thus new updates are added to uLayer 1112 in parallel with the consolidation process. So by the time consolidation concludes, 50-100 new entries may have been added to uLayer 1112 and the 24,000 threshold will soon be reached, which will again trigger another consolidation. As a result, this high consolidation frequency also significantly reduces long range random write IOPS.

Further, achieving higher random write IOPS requires a large amount of RAM. Indeed, one solution to these problems is to increase CPU processing power and/or increase the amount of RAM for CAT 1114. However, for low cost memory system products, increasing CPU processing power and/or increasing RAM are too expensive and are not viable options.

Technology is described to improve random write IOPS without increasing CPU processing power or increasing RAM.

Figure 12:
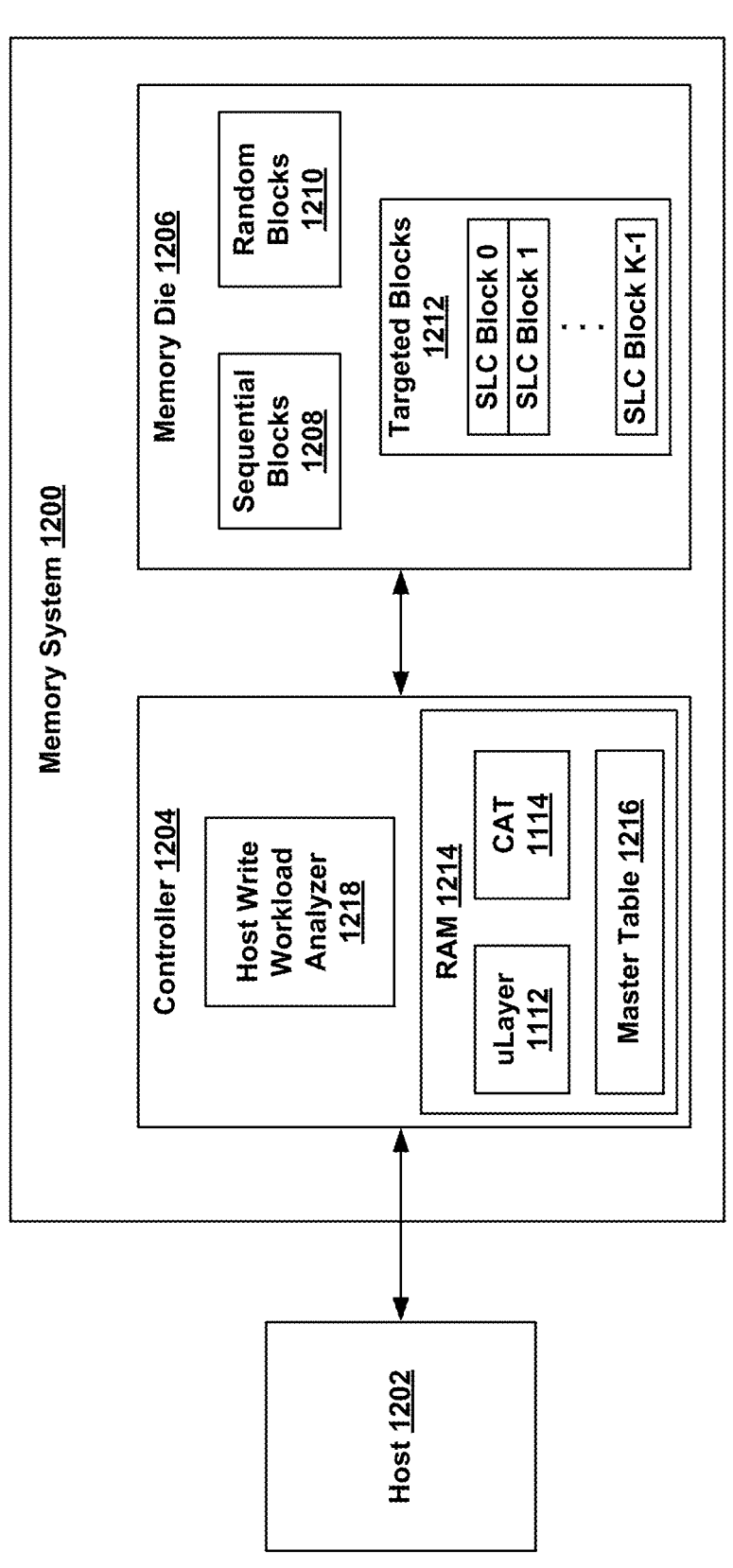
FIG. 12 is a simplified diagram of a NAND-based memory system coupled to a host.

FIG. 12 is a simplified diagram of a NAND-based memory system 1200 coupled to a host 1202. In embodiments, NAND-based memory system 1200 may be a SSD, a flash drive, a memory card, or other similar memory system. In an embodiment, NAND-based memory system 1200 includes a controller 1204 and one or more memory die 1206. In embodiments, host 1202 communicates read and write commands to controller 1204 for reading data from and writing data to memory die 1206.

In an embodiment, memory die 1206 includes first blocks 1208 for storing data from sequential write commands from host 1202, second blocks 1210 for storing data from random write commands from host 1202, and third blocks for storing targeted random write data, described in more detail below.

In an embodiment, controller 1204 includes RAM 1214 including uLayer 1112 and CAT 1114, as described above. In an embodiment, RAM 1214 also includes a Master Table 1216, and controller 1204 also includes a host write workload analyzer 1218, described below.

In embodiments, host 1202 provides sets of write commands to memory system 1200. In embodiments, each set of write commands may include sequential write commands, random write commands, or a combination of sequential write commands and random write commands. In embodiments, host write workload analyzer 1218 includes circuits and/or software configured to determine various characteristics of each set of write commands received from host 1202.

Figure 13:
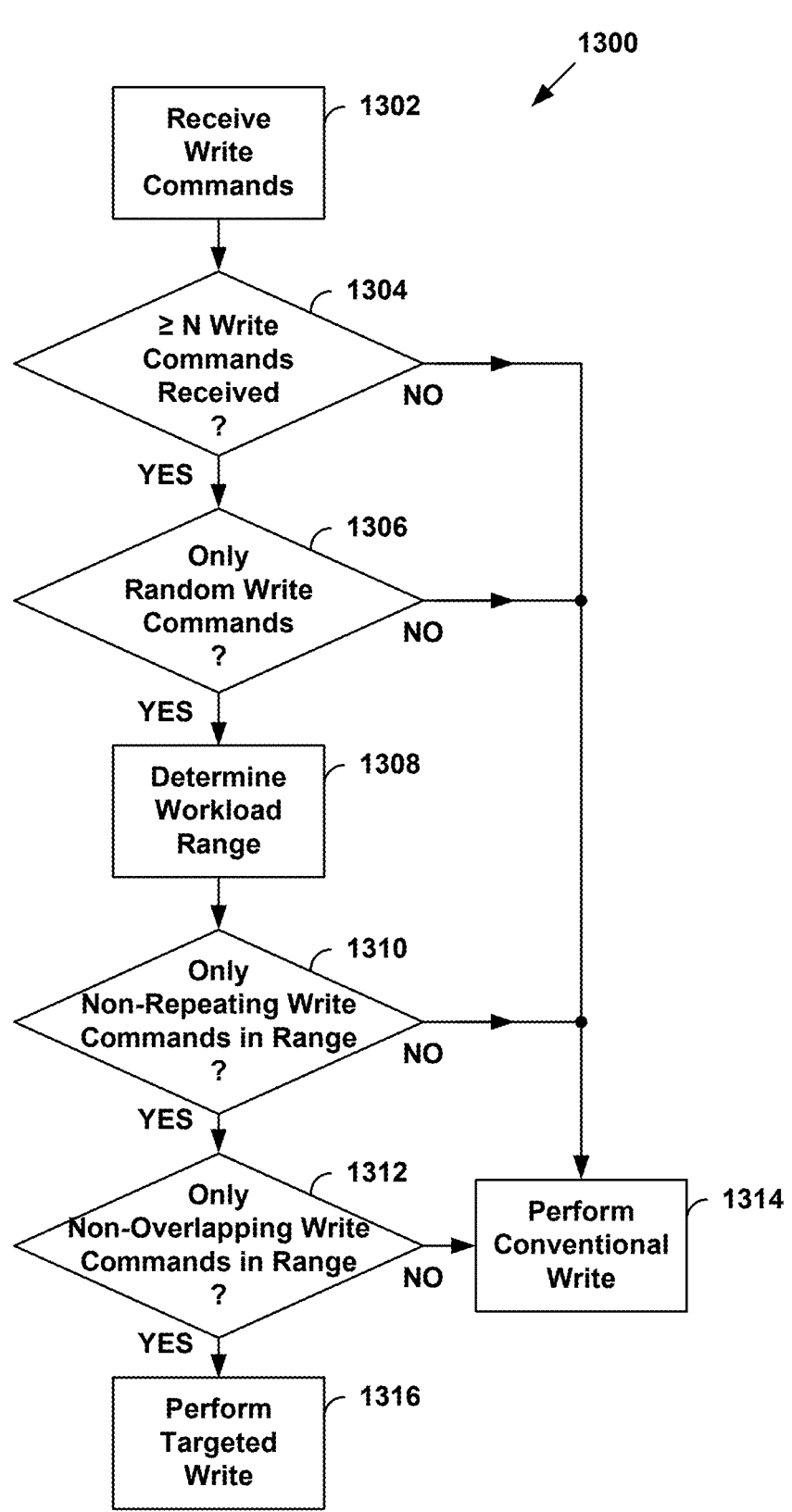
FIG. 13 is a flow diagram depicting an example workload analysis process implemented by host write workload analyzer.

FIG. 13 is a flow diagram depicting an example workload analysis process 1300 implemented by host write workload analyzer 1218. At step 1302, host write workload analyzer 1218 receives a set of write commands from host 1202. In embodiments, the set may include one or more write commands. The set of write commands received at step 1302 also is referred to herein as the host write workload.

At step 1304, host write workload analyzer 1218 determines whether the host write workload received at step 1302 includes at least a predetermined number N of write commands. In an embodiment, predetermined number N may be 500 or some other number.

If at step 1304 host write workload analyzer 1218 determines that the received host write workload includes at least N write commands, then at step 1306 host write workload analyzer 1218 determines whether the received host write workload includes only random write commands. As described above, a host write workload may include sequential write commands, random write commands, or a combination of sequential write commands and random write commands.

If at step 1306 host write workload analyzer 1218 determines that the received host write workload includes only random write commands, then at step 1308 host write workload analyzer 1218 determines a range of the received host write workload. For example, the received host write workload may include write commands that span 500 KB, 200 MB, 1 GB, 16 GB, 32 GB, or some other range.

At step 1310 host write workload analyzer 1218 determines whether the received host write workload includes only non-repeating write commands. As used herein, non-repeating means that the received host write workload includes no duplicate write commands for the same LBA.

If at step 1310 host write workload analyzer 1218 determines that the received host write workload includes only non-repeating write commands, then at step 1312 host write workload analyzer 1218 determines whether the received host write workload includes only non-overlapping write commands. As used herein, non-overlapping means that the received host write workload includes no write commands that share a common LBA or range of LBAs with any other write commands in the received host write workload.

If at step 1312 host write workload analyzer 1218 determines that the received host write workload includes only non-overlapping write commands, then at step 1316 controller 1204 performs a targeted write operation, described in more detail below.

If, however, host write workload analyzer 1218 determines at step 1304 that the received host write workload includes fewer than N write commands, or determines at step 1306 that the received host write workload includes one or more sequential write commands, or determines at step 1310 that the received host write workload includes at least one repeating write command, or determines at step 1312 that the received host write workload includes at least one overlapping write command, then at step 1314 controller 1204 performs a conventional write operation with the received host write workload.

For example, referring again to FIG. 12, in a conventional write operation controller 1204 writes sequential write command data to sequential blocks 1208, writes random write command data to random blocks 1210, and performs conventional L2P mapping (e.g., updates to uLayer 1112 and CAT 1114, as described above).

Figure 14:
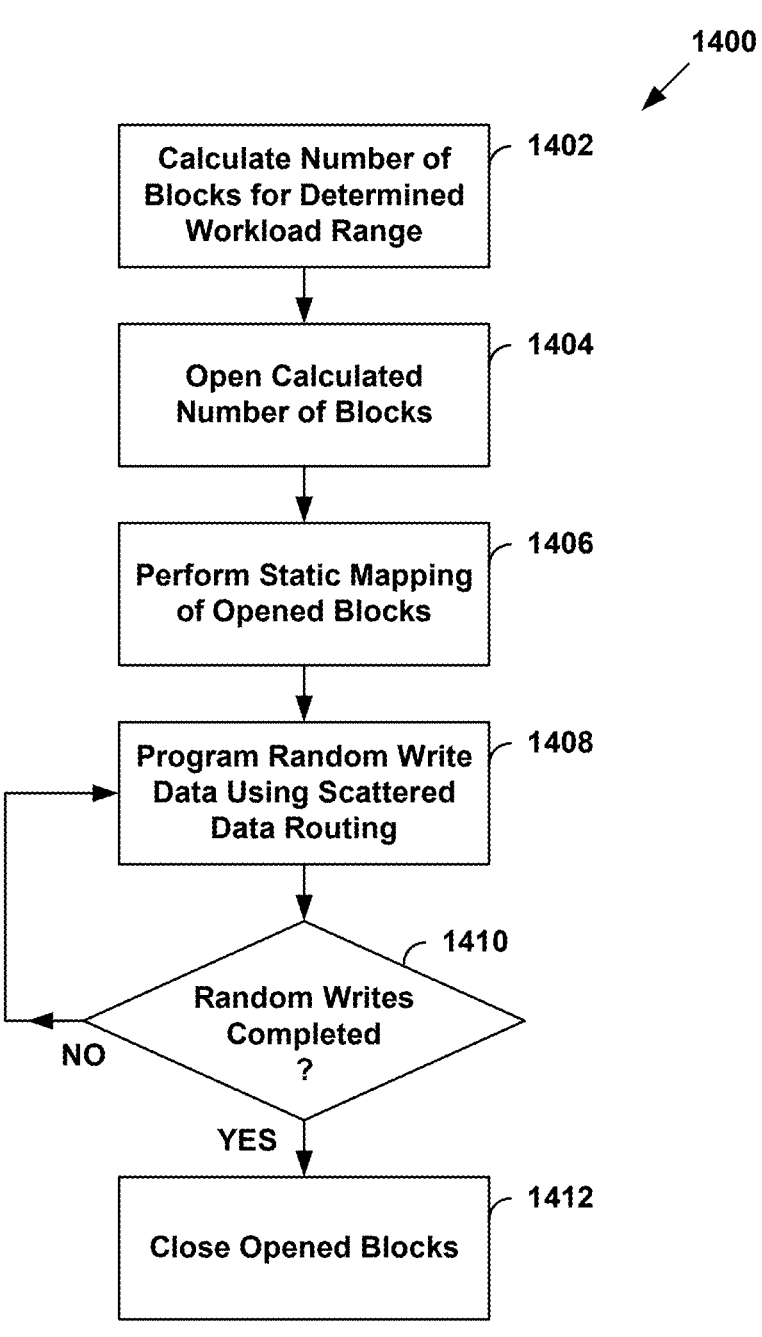
FIG. 14 is a flow diagram depicting an example targeted write process.

Referring again to FIG. 13, if host write workload analyzer 1218 determines that the host write workload received at step 1302 includes at least N random write commands that are non-repeating and non-overlapping, then at step 1316 controller 1204 performs a targeted write operation. FIG. 14 is a flow diagram depicting an example targeted write process 1400 implemented by controller 1204.

In the example targeted write process 1400 described below, burst mode is used to program random write data to SLC blocks. In particular, SLC blocks inherently have significantly lower program times, and provide high throughput. In addition, SLC blocks have high margins for partial page programming induced-program disturbs. Such disturbs are minor and do not require error correction mechanisms. Persons of ordinary skill in the art will understand, however that "hybrid SLC" blocks alternatively may be used. As used herein, a hybrid SLC block is an MLC block in which the MLC memory cells are temporarily operated as SLC memory cells. For simplicity, the description below will refer to "SLC blocks," which will be understood to mean SLC blocks and/or hybrid SLC blocks.

In addition, in the example targeted write process 1400 described below, during targeted write processing memory system 1200 does not perform any data relocation. This avoids complication with respect to die utilization, L2P maintenance, and relocation RAM.

At step 1402, controller 1204 calculates or determines a number of SLC blocks (M) needed to store the host write workload range determined at step 1308 (FIG. 13). For example, if the determined host write workload range is 32 GB, and if each SLC block stores up to 250 MB of data, the number of required SLC blocks to this this 32 GB random write workload is M=(32 GB×1 Block/250 MB)=128 blocks.

At step 1404, controller 1204 opens the number of SLC blocks calculated at step 1402 (i.e., M). As used herein, opening a block means erasing the block and preparing the block to be programmed with data. Conventionally, memory systems are configured to open only one block at a time, closing one block before opening another block. In the example targeted write process 1400, however, controller 1204 simultaneously opens M SLC blocks. In addition, pre-erase techniques also can be used.

At step 1406, controller 1204 statically maps ranges of LBAs in the received host write workload to the M SLC blocks opened at step 1404. In embodiments, the static mapping is saved in Master Table 1216 in RAM 1214 (FIG. 12).

For example, Table 4, below is an example static mapping of ranges of LBAs in the received host write workload to SLC block addresses. In embodiments, example Table 4 may be stored in Master Table 1216. For simplicity, the following example is for a workload range of 72 logical block addresses (LBA 0 . . . . LBA 71) that corresponds to M=3 SLC blocks (Block 0, Block 1 and Block 2), with ranges of 24 LBAs mapped to each SLC block.

TABLE 4

| LBA Range | Block Address |
| --- | --- |
| LBA 0-LBA 23 | PA0 (physical address Block 0) |
| LBA 24-LBA 47 | PA1 (physical address Block 1) |
| LBA 48-LBA 71 | PA2 (physical address Block 2) |

Thus, in this example, a first 24 logical block addresses LBA 0-LBA 23 are statically mapped to Block 0 with a starting physical address PA0, a second 24 logical block addresses LBA 24-LBA 47 are statically mapped to Block 1 with a starting physical address PA1, and a third 24 logical block addresses LBA 48-LBA 71 are statically mapped to Block 2 with a starting physical address PA2.

Referring again to FIG. 14, at step 1408 controller 1204 programs random write data using a scattered data routing technique. In an embodiment, with static mapping of ranges of LBAs to SLC blocks, each host random write maps to a corresponding targeted block offset. In an embodiment, this is facilitated by partial page programming for each of random write. In an embodiment, when a new host write command arrives, the flash management layer checks which LBA range the random write command belongs to (e.g., using Table 4) and then directs the random write to the corresponding block offset in the block.

Figure 15:
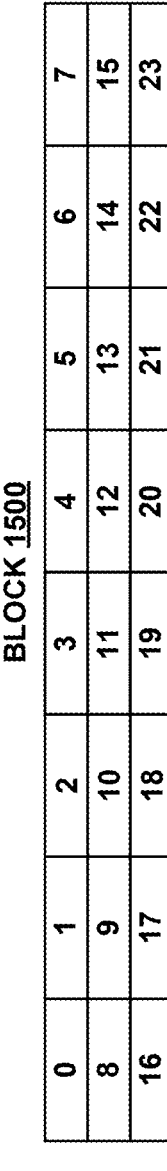
FIG. 15 is an example block depicting block offset values.

FIG. 15 depicts example block offsets within an SLC block 1500. In an embodiment, each block offset corresponds to a flash management unit ("FMU") (e.g., a 4 KB FMU), with each row in SLC block 1500 corresponding to a 32 KB page. As depicted in FIG. 15, SLC block 1500 includes 24 block offsets 0, 1, 2, . . . , 23.

In an embodiment, controller 1204 statically maps each host random write to a corresponding block as determined in Master Table 1216, and then to a corresponding block offset within the block using a one-to-one relationship between the LBA of the host random write and the block offset, normalized to the number of block offsets in each block.

For example, FIG. 16 illustrates this mapping using an example host write workload that includes seven random write commands RW0, RW1, RW2, RW3, RW4, RW5, RW6 having logical block addresses LBA 4, LBA 32, LBA 21, LBA 57, LBA 17, LBA 45, LBA 26, respectively, and associated write data A, B, C, D, E, F, G, respectively.

Using example Table 4, above, logical block addresses LBA 4, LBA 32, LBA 21, LBA 57, LBA 17, LBA 45, and LBA 26 map to corresponding Block 0, Block 1, Block 0, Block 2, Block 0, Block 1, and Block 1, respectively. Thus, the physical block address corresponding to these logical block addresses may be determined as follows:

| LBA | Block | Block Offset | PBA |
|---|---|---|---|
| LBA 4 | 0 | $4 - (0 \times 24) = 4$ | PA0 + 4 |
| LBA 32 | 1 | $32 - (1 \times 24) = 8$ | PA1 + 8 |
| LBA 21 | 0 | $21 - (0 \times 24) = 21$ | PA0 + 21 |
| LBA 57 | 2 | $57 - (2 \times 24) = 9$ | PA2 + 9 |
| LBA 17 | 0 | $17 - (0 \times 24) = 17$ | PA0 + 17 |
| LBA 45 | 1 | $45 - (1 \times 24) = 21$ | PA1 + 21 |
| LBA 26 | 1 | $26 - (1 \times 24) = 2$ | PA1 + 2 |

This scattered data routing scheme is depicted in FIG. 16. In conventional programming operations, data are written in a sequential manner and then an entry of logical to physical location is made as part of an L2P table. In the technique described above, in contrast, the reverse is performed. Controller 1204 uses a predetermined L2P mapping, and then simply writes that data according to the predetermined mapping. In this regard, controller 1204 statically maps each host random write to non-sequential FMUs in Block 0, Block 1 and Block 2.

Referring again to FIG. 14, at step 1410 controller 1204 determines if all write commands in the host write workload have completed. If controller 1204 determines that some write commands remain waiting to be completed, process 1400 loops back to step 1408 and continues programing random write data using the scattered data routing technique. If, however, at step 1410 controller 1204 determines that all write commands have been completed then at step 1412 controller 1204 closes the M SLC blocks that were opened at step 1404.

In embodiments, once controller 1204 closes the M SLC blocks, the blocks become normal blocks with respect to block management techniques—meaning that garbage collection operations, relocation, block rotation, wear leveling, etc.—all of those actions become conventional on these blocks.

Thus, in a targeted write process, such as example targeted write process 1400, an L2P update for every random write is not required. L2P updates need to be done only for overwrites cases.

Without wanting to be bound by any particular theory, it is believed that the described technology avoids L2P updates during targeted random write workloads (e.g., non-repeating, non-overlapping random write workloads). Without wanting to be bound by any particular theory, it is believed that the described technology may require significantly less CPU processing and help to improve random write IOPS.

Without wanting to be bound by any particular theory, it is believed that the described technology facilitates direct mapping of LBAs to locations in physical blocks. Without wanting to be bound by any particular theory, it is believed that this may avoid higher RAM budget requirements to accumulate deltas of random write workloads, especially long range random write workloads.

Without wanting to be bound by any particular theory, it is believed that the described technology requires no L2P updates and may avoid corresponding CPU overhead. Without wanting to be bound by any particular theory, it is believed that the described technology may provide similar performance across long range workloads without high RAM requirements for delta cache and CAT. Without wanting to be bound by any particular theory, it is believed that the described technology may be a better solution for low-cost limited RAM products.

Without wanting to be bound by any particular theory, it is believed that in the described technology translations of random data are substantially instantaneous. Because each LBA has predefined offset within an SLC block, translation requires access to only the SLC block array maintained for targeted random write workloads.

Without wanting to be bound by any particular theory, it is believed that because the described technology uses static mapping, after a power cycle L2P recovery need not be performed. Without wanting to be bound by any particular theory, it is believed that this may significantly reduce initialization time.

In embodiments, a management table module ("MTM") is configured to erase/write/read an L2P table maintained in NAND (e.g., mLayer 1110 of FIG. 11), and also may be configured to perform garbage collection activities like compaction/relocation. Without wanting to be bound by any particular theory, it is believed that the described technology may reduce consolidations, may reduce MTM writes, and may improve MTM write amplification (amount of MTM writes per host data).

In particular, without wanting to be bound by any particular theory, it is believed that in the above-described technology, host writes are routed as per pre-determined L2P mapping, and therefore each write does not need an L2P update. Without wanting to be bound by any particular theory, it is believed that this may avoid L2P compaction (e.g., read-modify-write). That is, read an mSet from mLayer 1110, modify the mSet as per new updates in uLayer 1112, and write mSet to mLayer 1110 in NAND. Without wanting to be bound by any particular theory, it is believed that in the above described technology, writes to mLayer 1110 are minimal as compaction is not triggered, and hence MTM writes may be reduced.

Figure 17:
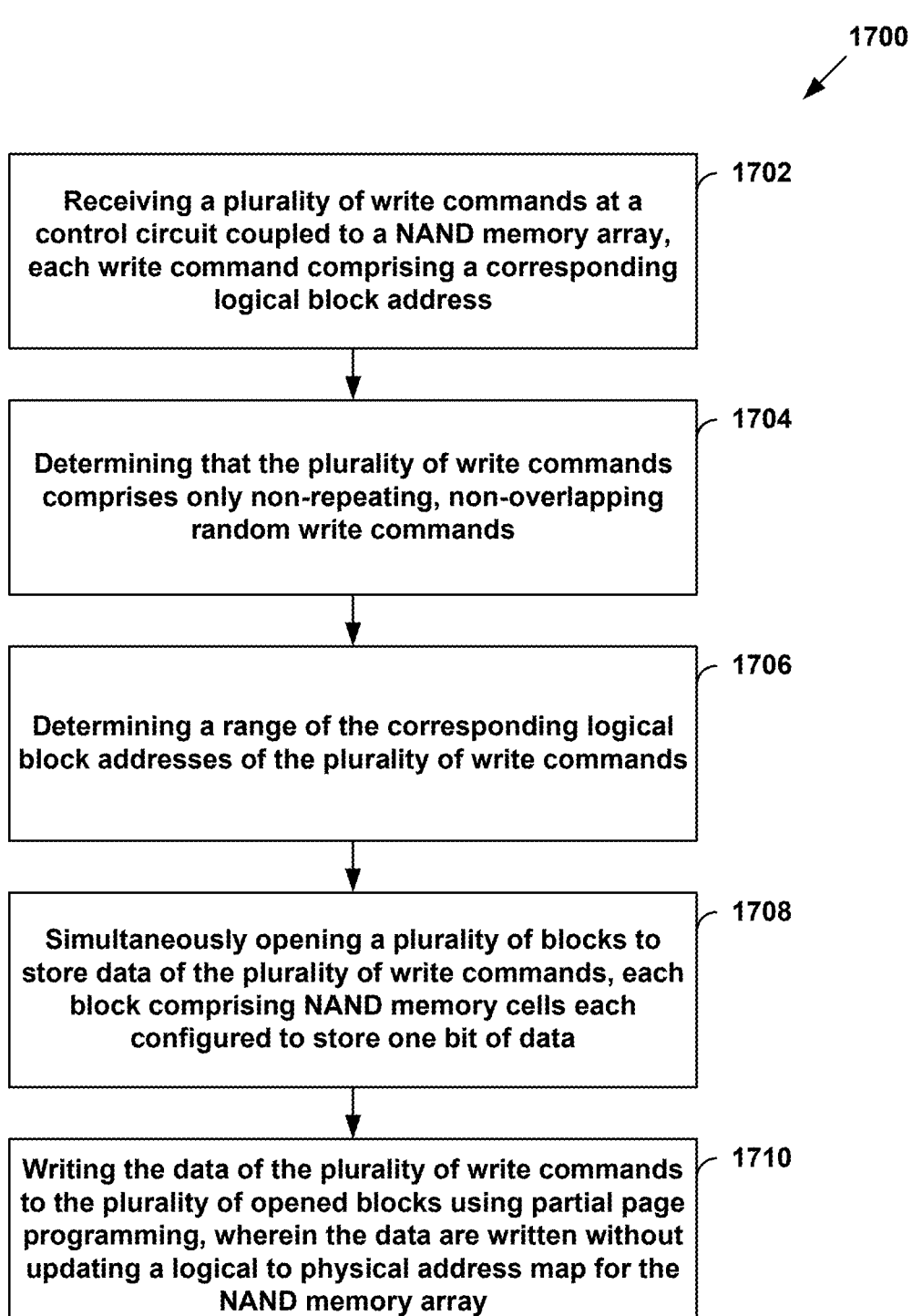
FIG. 17 is a flow diagram of a process for processing host random write commands.

FIG. 17 is a flow diagram of a process 1700 for processing host random write commands. In embodiments, process 1700 is performed on memory die 106 (FIG. 1), memory die 400 (FIG. 4), memory die 500 (FIG. 5A), or memory die 606 (FIGS. 6A-6B) using the control circuits discussed above. For example, process 1700 can be performed at the direction of controller 104 (FIG. 1), state machine 528 (FIGS. 5A-5B) or control die 604 (FIGS. 6A-6B).

At step 1702, receiving a plurality of write commands at a control circuit coupled to a NAND memory array, each write command including a corresponding logical block address.

At step 1704, determining that the plurality of write commands includes only non-repeating, non-overlapping random write commands.

At step 1706, determining a range of the corresponding logical block addresses of the plurality of write commands.

At step 1708, simultaneously opening a plurality of blocks to store data of the plurality of write commands, each block including NAND memory cells each configured to store one bit of data.

At step 1710, writing the data of the plurality of write commands to the plurality of opened blocks using partial page programming, wherein the data are written without updating a logical to physical address map for the NAND memory array.

According to aspects of the present technology, an apparatus is provided that includes a memory array including blocks of non-volatile memory cells and a control circuit coupled to the memory array. The control circuit is configured to receive a first plurality of write commands, determine that the first plurality of write commands satisfies predetermined criteria, and process the first plurality of write commands by: statically mapping the logical block addresses to corresponding physical block addresses of a first plurality of the blocks of non-volatile memory cells, and writing data from the first plurality of write commands to the first plurality of blocks.

According to another set of aspects, an apparatus is provided that includes a memory array including non-volatile memory cells, and a control circuit coupled to the memory array. The control circuit is configured to receive a plurality of random write commands, determine a range of logical block addresses in the plurality of random write commands, determine a number of a blocks needed to store data of the random write commands, wherein each block comprises memory cells configured to store one bit of data per memory cell, simultaneously open the determined number of blocks, statically map the logical block addresses to corresponding physical block addresses of the opened blocks of non-volatile memory cells, and write data from the random write commands to non-sequential flash management units in the opened blocks.

In another set of aspects, a method is provided including receiving a plurality of write commands at a control circuit coupled to a NAND memory array, each write command including a corresponding logical block address, determining that the plurality of write commands includes only non-repeating, non-overlapping random write commands, determining a range of the corresponding logical block addresses of the plurality of write commands; simultaneously opening a plurality of blocks to store data of the plurality of write commands, each block including NAND memory cells each configured to store one bit of data, and writing the data of the plurality of write commands to the plurality of opened blocks using partial page programming, wherein the data are written without updating a logical to physical address map for the NAND memory array.

For purposes of this document, reference in the specification to "an embodiment," "an embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. An apparatus comprising:
a memory array comprising blocks of non-volatile memory cells; and
a control circuit coupled to the memory array, the control circuit configured to:
receive a first plurality of write commands;
determine that the first plurality of write commands satisfies predetermined criteria of only non-overlapping random write commands;
process the first plurality of write commands that satisfies the predetermine criteria by:
statically mapping the logical block addresses to corresponding physical block addresses of a first plurality of the blocks of non-volatile memory cells; and
writing data from the first plurality of write commands to the first plurality of blocks.

2. The apparatus of claim 1, wherein the first plurality of write commands comprise random write commands.

3. The apparatus of claim 1, wherein each of the first plurality of write commands comprise less than a page of data.

4. The apparatus of claim 1, wherein the control circuit is further configured to determine a range of logical block addresses in the first plurality of write commands.

5. The apparatus of claim 4, wherein the control circuit is further configured to determine a number of a blocks needed to store data of the determined range of logical block addresses, wherein each block comprises memory cells configured to store one bit of data per memory cell.

6. The apparatus of claim 1, wherein determining that the first plurality of write commands satisfies predetermined criteria comprises determining that the first plurality of write commands comprise non-repeating, non-overlapping write commands.

7. The apparatus of claim 1, wherein the first plurality of the blocks comprise memory cells configured to store one bit of data per memory cell.

8. The apparatus of claim 1, wherein the first plurality of the blocks comprise memory cells that may store more than one bit of data per memory cell, but the control circuit is configured to store only one bit of data per memory cell in the first plurality of the blocks.

9. The apparatus of claim 1, wherein the control circuit is further configured to write data to the first plurality of blocks using partial page programming.

10. The apparatus of claim 1, wherein the control circuit is further configured to write data to the first plurality of blocks using a one-to-one mapping of logical block addresses to corresponding block offsets.

11. The apparatus of claim 1, wherein the control circuit is further configured to:
receive a second plurality of write commands;
determine that the second plurality of write commands does not satisfy the predetermined criteria;

write data from the second plurality of write commands to sequential blocks of non-volatile memory cells; and create entries corresponding to the second plurality of write commands in a logical to physical address mapping table.

12. An apparatus comprising:

a memory array comprising non-volatile memory cells; and a control circuit coupled to the memory array, the control circuit configured to:

receive a plurality of random write commands of only non-overlapping random write commands;

determine a range of logical block addresses in the random write commands;

determine a number of a blocks needed to store data of the random write commands, wherein each block comprises memory cells configured to store one bit of data per memory cell;

simultaneously open the determined number of blocks;

statically map the logical block addresses to corresponding physical block addresses of the opened blocks of non-volatile memory cells; and write data from the random write commands to non-sequential flash management units in the opened blocks.

13. The apparatus of claim 12, wherein the control circuit is further configured to prevent relocation of data in the opened blocks.

14. The apparatus of claim 12, wherein the control circuit is further configured to close all of the opened blocks after completing writing data from the random write commands.

15. The apparatus of claim 14, wherein the control circuit is further configured to allow relocation of data in the closed blocks.

16. The apparatus of claim 12, wherein the plurality of random write commands comprise non-repeating, non-overlapping random write commands.

17. The apparatus of claim 12, wherein the control circuit is further configured to write data to the opened blocks using partial page programming.

18. The apparatus of claim 12, wherein the control circuit is further configured to write data from the random write commands to the memory array without updating a logical to physical address mapping table.

19. A method comprising:

receiving a plurality of write commands at a control circuit coupled to a NAND memory array, each write command comprising a corresponding logical block address;

determining that the plurality of write commands of only non-repeating, non-overlapping random write commands;

determining a range of the corresponding logical block addresses of the plurality of write commands;

simultaneously opening a plurality of blocks to store data of the plurality of write commands, each block comprising NAND memory cells each configured to store one bit of data; and writing the data of the plurality of write commands to the plurality of opened blocks using partial page programming, wherein the data are written without updating a logical to physical address map for the NAND memory array.

* * * * *